United States Patent
Krol et al.

(10) Patent No.: US 11,876,630 B1
(45) Date of Patent: *Jan. 16, 2024

(54) ARCHITECTURE TO CONTROL ZONES

(71) Applicant: Katmai Tech Inc., New York, NY (US)

(72) Inventors: Gerard Cornelis Krol, Leiden (NL); Petr Polyakov, Tampa, FL (US); Erik Stuart Braund, Saugerties, NY (US)

(73) Assignee: KATMAI TECH INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/813,663

(22) Filed: Jul. 20, 2022

(51) Int. Cl.
*H04L 12/18* (2006.01)

(52) U.S. Cl.
CPC ...... *H04L 12/1822* (2013.01); *H04L 12/1818* (2013.01); *H04L 12/1831* (2013.01)

(58) Field of Classification Search
CPC .............. H04L 12/1822; H04L 12/1818; H04L 12/1831
See application file for complete search history.

(56) References Cited

U.S. PATENT DOCUMENTS

| | | |
|---|---|---|
| 6,215,498 B1 | 4/2001 | Filo et al. |
| 6,559,863 B1 | 5/2003 | Megiddo |
| 6,583,808 B2 | 6/2003 | Boulanger et al. |
| 6,853,398 B2 | 2/2005 | Malzbender et al. |
| 7,197,126 B2 | 3/2007 | Kanada |
| 7,346,654 B1 | 3/2008 | Weiss |
| 7,634,073 B2 | 12/2009 | Kanada |
| 7,840,668 B1 | 11/2010 | Sylvain et al. |
| 8,072,479 B2 | 12/2011 | Valliath et al. |
| 8,279,254 B2 | 10/2012 | Goose et al. |
| 8,403,751 B2 | 3/2013 | Boustead et al. |
| 8,520,872 B2 | 8/2013 | Jang et al. |
| 8,620,009 B2 | 12/2013 | Zhang et al. |
| 8,675,067 B2 * | 3/2014 | Chou ............... H04N 7/147 348/149 |
| 9,041,764 B2 | 5/2015 | Wang et al. |
| 9,218,685 B2 | 12/2015 | Piemonte et al. |

(Continued)

FOREIGN PATENT DOCUMENTS

| | | |
|---|---|---|
| CN | 103580881 A | 2/2014 |
| CN | 105487657 A | 4/2016 |

(Continued)

OTHER PUBLICATIONS

Dipaola, S. and Collins, D., "A 3D Virtual Environment for Social Telepresence", Mar. 2002; 6 pages.

(Continued)

*Primary Examiner* — Farzana B Huq
(74) *Attorney, Agent, or Firm* — Sterne, Kessler, Goldstein & Fox P.L.L.C.

(57) ABSTRACT

Disclosed herein is a web-based videoconference system that allows for video avatars to navigate within the three-dimensional virtual environment. The system and methods provided include those for: (1) using zones in a three-dimensional virtual environment for limiting audio and video, (2) access control using zones, (3) access control of the three-dimensional virtual environment itself, and (4) controlling user connections in a three dimensional virtual environment.

24 Claims, 13 Drawing Sheets

(56) References Cited

U.S. PATENT DOCUMENTS

| | | | |
|---|---|---|---|
| 9,305,319 | B2 | 4/2016 | Maor et al. |
| 9,384,594 | B2 | 7/2016 | Maciocci et al. |
| 9,420,229 | B2 | 8/2016 | Pourashraf et al. |
| 9,565,316 | B2 | 2/2017 | Gleim |
| 9,607,428 | B2 | 3/2017 | Li |
| 9,656,168 | B1 | 5/2017 | Bear et al. |
| 9,661,274 | B2 | 5/2017 | Kubota et al. |
| 9,743,044 | B2 | 8/2017 | Safaei et al. |
| 9,910,509 | B2 | 3/2018 | Markovic et al. |
| 10,013,805 | B2 | 7/2018 | Barzuza et al. |
| 10,155,164 | B2 | 12/2018 | Boustead et al. |
| 10,304,238 | B2 | 5/2019 | Cooper et al. |
| 10,304,239 | B2 | 5/2019 | Gorur Sheshagiri et al. |
| 10,334,384 | B2 | 6/2019 | Sun et al. |
| 10,356,216 | B2 | 7/2019 | Khalid et al. |
| 10,573,071 | B2 | 2/2020 | Sun et al. |
| 10,609,334 | B2 | 3/2020 | Li |
| 10,679,411 | B2 | 6/2020 | Ziman |
| 10,979,672 | B1 | 4/2021 | Krol et al. |
| 11,057,351 | B1 | 7/2021 | Simanel et al. |
| 2002/0158873 | A1 | 10/2002 | Williamson |
| 2007/0274528 | A1 | 11/2007 | Nakamoto et al. |
| 2009/0113314 | A1 | 4/2009 | Dawson et al. |
| 2009/0282472 | A1* | 11/2009 | Hamilton, II ....... H04L 63/0428 726/15 |
| 2011/0063286 | A1* | 3/2011 | Roberts ............... G06F 3/04815 715/850 |
| 2011/0072367 | A1 | 3/2011 | Bauer |
| 2013/0321564 | A1 | 12/2013 | Smith et al. |
| 2014/0058807 | A1 | 2/2014 | Altberg et al. |
| 2015/0302661 | A1 | 10/2015 | Miller |
| 2017/0351476 | A1 | 12/2017 | Yoakum |
| 2019/0199993 | A1 | 6/2019 | Babu J D et al. |
| 2019/0310761 | A1 | 10/2019 | Agarawala et al. |
| 2019/0320144 | A1 | 10/2019 | Tong et al. |
| 2019/0354170 | A1 | 11/2019 | Rosedale |
| 2019/0371060 | A1* | 12/2019 | Energin ................ G06T 19/006 |
| 2020/0008003 | A1 | 1/2020 | Thompson et al. |
| 2020/0037091 | A1 | 1/2020 | Jeon et al. |
| 2020/0098191 | A1 | 3/2020 | McCall |
| 2020/0221247 | A1 | 7/2020 | Latypov et al. |
| 2022/0124286 | A1* | 4/2022 | Punwani ............. G06F 3/04815 |

FOREIGN PATENT DOCUMENTS

| | | |
|---|---|---|
| CN | 103888714 B | 4/2017 |
| CN | 106648528 A | 5/2017 |
| CN | 108319439 A | 7/2018 |
| CN | 106528038 B | 9/2019 |
| EP | 3282669 B1 | 1/2020 |
| EP | 3627860 A1 | 3/2020 |
| EP | 3684083 A1 | 7/2020 |
| GB | 2351216 B | 12/2002 |
| JP | H07288791 A | 10/1995 |
| JP | 2003006132 A | 1/2003 |
| JP | 4426484 B2 | 3/2010 |
| KR | 20200028871 A | 3/2020 |
| WO | WO 2008125593 A2 | 10/2008 |
| WO | WO 2008141596 A1 | 11/2008 |
| WO | WO 2010083119 A2 | 7/2010 |
| WO | WO 2010143359 A1 | 12/2010 |
| WO | WO 2018005235 A1 | 1/2018 |
| WO | WO 2019008320 A1 | 1/2019 |
| WO | WO 2019046597 A1 | 3/2019 |
| WO | WO 2020041652 A1 | 2/2020 |

OTHER PUBLICATIONS

EngageVR, "Next Generation Education, Training, Meetings & Events," accessed at https://engagevr.io/, accessed on Oct. 28, 2020; 6 pages.

Event Farm, "Bring Your Events Into the Virtual World," accessed at https://eventfarm.com/the-echo, accessed on Oct. 28, 2020; 6 pages.

Hongtongsak, K., "Accurately Pinpointing 3D Sound in Virtual Environments," Jun. 2016, 31 pages.

Johansson, N., "The 10 Best VR Meeting Apps—Productive Remote Collaboration," accessed at https://immersive.ly/best-vr-apps-productive-remote-meetings/, accessed on Oct. 28, 2020; 10 pages.

Leung, W. and Chen, T., "Networked Collaborative Environment With Animated 3D Avatars, Dept. of Electrical and Computer Engineering Carnegie Mellon University," Aug. 6, 2002; 3 pages.

Leung, W. et al.., "Networked Intelligent Collaborative Environment (NetICE), Multimedia and Expo 2000," Aug. 6, 2002; 4 pages.

Leung, W. and Chen, T., "A Multi-User 3-D Virtual Environment With Interactive Collaboration and Shared Whiteboard Technologies, Kluwer Academic Publishers," Jul. 23, 2003, 17 pages.

Lin, J. et al., "A Virtual Reality Platform for Dynamic Human-Scene Interaction," Dec. 2016; 4 pages.

Nishihara, R. and Okubo, M., "A Study on Personal Space in Virtual Space Based on Personality," 2015; 8 pages.

Sandre, A., "Is Virtual Reality the Future of Video Conferencing?" May 15, 2020; 7 pages.

De Sousa, A., "Remote Proxemics for Collaborative Virtual Environments," Nov. 2014; 10 pages.

Takahashi, D., "MeetinVR launches online VR meetings with 'superpowers'," venturebeat.com, accessed at https://venturebeat.com/2020/05/27/meetinvr-launches-online-vr-meetings-with-superpowers, published May 27, 2020; 7 pages.

Teooh, "Virtual Spaces for Real Communities," accessed at https://teooh.com/, accessed on Oct. 28, 2020; 3 pages.

VirBELA Media, "Team Suites," accessed at https://www.virbela.com/teamsuites, accessed on Oct. 1, 2020; 26 pages.

Virtway Events, "Your 3D Space for Events," accessed at https://www.virtwayevents.com/, accessed on Oct. 28, 2020; 5 pages.

SaganWorks product website, "A personal metaverse of knowledge: Create stunning spaces to organize and store your information," available at https://saganworks.com, accessed Aug. 4, 2022; 4 pages.

Spatial, "Frequently Asked Questions," product website available at https://support.spatial.io/hc/en-us, accessed Aug. 4, 2022; 3 pages.

VSpatial product website, Virtual Reality Offices, "The workspace of the Future is Here." available at https://vspatial.com, accessed Aug. 4, 2022; 5 pages.

LearnOpenGL—CSM Online Resource, "Cascaded Shadow Mapping," available at https://learnopengl.com/Guest-Articles/2021/CSM, accessed Aug. 2, 2022; 10 pages.

Wikipedia, online resource, "Shadow mapping," available at https://en.wikipedia.org/wiki/Shadow_mapping, accessed Aug. 2, 2022; 6 pages.

Wikipedia, online resource, "Volumetric lighting," available at https://en.wikipedia.org/wiki/Volumetric_lighting, accessed Aug. 2, 2022; 2 pages.

* cited by examiner

ARCHITECTURE TO CONTROL ZONES

TECHNICAL FIELD

This field is generally related to videoconferencing.

BACKGROUND

Video conferencing involves the reception and transmission of audio-video signals by users at different locations for communication between people in real time. Videoconferencing is widely available on many computing devices from a variety of different services, including the ZOOM service available from Zoom Communications Inc. of San Jose, CA. Some videoconferencing software, such as the FaceTime application available from Apple Inc. of Cupertino, CA, comes standard with mobile devices.

In general, these applications operate by displaying video and outputting audio of other conference participants. When there are multiple participants, the screen may be divided into a number of rectangular frames, each displaying video of a participant. Sometimes these services operate by having a larger frame that presents video of the person speaking. As different individuals speak, that frame will switch between speakers. The application captures video from a camera integrated with the user's device and audio from a microphone integrated with the user's device. The application then transmits that audio and video to other applications running on other user devices.

Many of these videoconferencing applications have a screen share functionality. When a user decides to share their screen (or a portion of their screen), a stream is transmitted to the other users' devices with the contents of their screen. In some cases, other users can even control what is on the user's screen. In this way, users can collaborate on a project or make a presentation to the other meeting participants.

Recently, videoconferencing technology has gained importance. Especially since the COVID-19 pandemic, many workplaces, trade shows, meetings, conferences, schools, and places of worship are now taking place at least partially online. Virtual conferences using videoconferencing technology are increasingly replacing physical conferences. In addition, this technology provides advantages over physically meeting to avoid travel and commuting.

However, often, use of this videoconferencing technology causes loss of a sense of place. There is an experiential aspect to meeting in person physically, being in the same place, that is lost when conferences are conducted virtually. There is a social aspect to being able to posture yourself and look at your peers. This feeling of experience is important in creating relationships and social connections. Yet, this feeling is lacking when it comes to conventional videoconferences.

Moreover, when the conference starts to get several participants, additional problems occur with these videoconferencing technologies. In physical meeting conferences, people can have side conversations. You can project your voice so that only people close to you can hear what you're saying. In some cases, you can even have private conversations in the context of a larger meeting. However, with virtual conferences, when multiple people are speaking at the same time, the software mixes the two audio streams substantially equally, causing the participants to speak over one another. Thus, when multiple people are involved in a virtual conference, private conversations are impossible, and the dialogue tends to be more in the form of speeches from one to many. Here, too, virtual conferences lose an opportunity for participants to create social connections and to communicate and network more effectively.

Moreover, due to limitations in the network bandwidth and computing hardware, when numerous streams are placed in the conference, the performance of many videoconferencing systems begins to slow down. Many computing devices, while equipped to handle a video stream from a few participants, are ill-equipped to handle a video stream from a dozen or more participants. With many schools operating entirely virtually, classes of 25 can severely slow down the school-issued computing devices.

Massively multiplayer online games (MMOGs, or MMOs) generally can handle quite a few more than 25 participants. These games often have hundreds or thousands of players on a single server. MMOs often allow players to navigate avatars around a virtual world. Sometimes these MMOs allow users to speak with one another or send messages to one another. Examples include the ROBLOX game available from Roblox Corporation of San Mateo, CA, and the MINECRAFT game available from Mojang Studios of Stockholm, Sweden.

Having bare avatars interact with one another also has limitations in terms of social interaction. These avatars usually cannot communicate facial expressions, which people often make inadvertently. These facial expressions are observable on videoconferences. Some publications may describe having video placed on an avatar in a virtual world. However, these systems typically require specialized software and have other limitations that limit their usefulness.

Improved methods are needed for videoconferencing.

SUMMARY

In aspects, a system, computer-implemented method, and non-transitory computer readable medium including instructions to perform operations for controlling audio and video streams in a three-dimensional virtual environment are disclosed. The three-dimensional virtual environment can be used in videoconferencing applications. The system, method, and operations can be implemented by, or by using, one or more computing devices (e.g., computers, servers, etc.). In aspects, the system, method, and operations can receive a current position of a first user in the three-dimensional virtual environment. In aspects, using the current position, a future position of the first user in the three-dimensional virtual environment can be predicted. In aspects, based on predicting the future position of the first user, a determination can be made as to which zone in the three-dimensional virtual environment the first user will belong to at a future time.

A zone refers to an area in the three-dimensional virtual environment. For example, a zone can be a bounded space/area that can be referenced and/or bounded using Cartesian coordinates in the three-dimensional virtual environment. A zone can represent a variety of spaces/areas within the three-dimensional virtual environment. For example, in a videoconferencing application, a zone can represent a virtual conference room, a virtual office, a virtual hallway, a virtual office building, a room within the virtual office building, etc. In MMO applications, a zone can represent a level of the MMO, a room within a level of the MMO, a specific location within a level of the MMO, etc. In aspects, a zone may be subdivided into sub-zones. For example, a room can be partitioned into sub-rooms each being its own zone. These are merely examples of what the zone can represent. A person of skill in the art (POSA) will understand what can constitute a zone by reading this disclosure.

In aspects, based on predicting the zone the first user will belong to, a determination can be made as to which of a plurality of users within the zone to enable an audio stream or a video stream for. Enabling the audio stream or the video stream will allow the first user to see or hear each of the plurality of users for which the audio stream or the video stream is enabled when the first user and each of the plurality of users are positioned within the zone. In aspects, based on the first user being less than a threshold distance to the zone, the audio stream or the video stream of each of the plurality of users can be enabled for each of the plurality of users for which a determination was made to enable the audio stream or the video stream. The threshold distance to the zone refers to a Euclidean distance to the zone. In aspects, if the first user is less than the threshold distance, the audio stream or the video stream of each of the plurality of users will be enabled for each of the plurality of users for which the determination was made to enable the audio stream or the video stream.

In aspects, determining which zone in the three-dimensional virtual environment the first user will belong to at a future time can be based on a distance of the first user to one or more zones, a direction of travel of the first user, a velocity of the first user, or rotational movements of the first user.

In aspects, the system, method, and operations can further include disabling the audio stream and the video stream of each of the plurality of users based on the first user being greater than or equal to the threshold distance to the zone. The disabling will cause the first user to not be able to see or hear each of the plurality of users.

In aspects, the system, method, and operations can further include filtering the plurality of users based on security settings of the plurality of users. In aspects, the system, method, and operations can further include filtering the plurality of users based on security settings of the first user.

In aspects, the system, method, and operations can further include disabling the video stream of each of the plurality of users for the first user based on the first user and each of the plurality of users not being positioned to view each other in the zone.

In aspects, the system, method, and operations can further include receiving a current position of a second user in the three-dimensional virtual environment. Based on the current position of the second user, a second future position of the second user in the three-dimensional virtual environment can be predicted. In aspects, based on predicting the second future position of the second user, the system, method, and operations can further include determining whether the second user will be less than the threshold distance to the zone at a second future time. In aspects, based on determining the second user will be less than the threshold distance to the zone, the system, method, and operations can further include enabling the audio stream or the video stream of the second user to enable the first user to see or hear the second user when the first user and the second user are positioned within the zone.

In aspects, a system, computer-implemented method, and non-transitory computer readable medium including instructions to perform operations for access control of a zone in a three-dimensional virtual environment are disclosed. The system, method, and operations can be implemented by, or by using, one or more computing devices (e.g., computers, servers, etc.). In aspects, the system, method, and operations can include detecting that a user is within a threshold distance of the zone in the three-dimensional virtual environment. In aspects, based on settings in a user profile of the user, a determination can be made as to whether the user can access the zone. In aspects, the system, method, and operations can further include determining, based on settings in a zone profile of the zone, whether the user can access the zone.

In aspects, if determined that the user can access the zone, the user can be granted full or partial access to the zone. If determined that the user cannot access the zone, the user can be denied full or partial access to the zone. In aspects, the system, method, and operations can further include transmitting a hyperlink to a user device that, when clicked, grants the user full or partial access to the zone based on determining whether to grant the user full or partial access to the zone. In further aspects, an access code can be transmitted to a user device that, when entered into a display of the three-dimensional virtual environment, grants the user full or partial access to the zone based on determining whether to grant the user full or partial access to the zone.

In aspects, denying the user full or partial access to the zone can include denying a user avatar full or partial visual access to areas of the zone. Denying the user avatar full or partial visual access can include displaying a visual indicator indicating the user avatar cannot have access to areas of the zone. In further aspects, denying the user full visual access can include limiting movements of the user avatar within the zone. In further aspects, denying the user full or partial access to the zone includes denying full or partial data communication privileges to the user within the zone. The data communication privileges can include: reading data, writing data, displaying data, sharing data, or a combination thereof, within the zone.

In aspects, a system, computer-implemented method, and non-transitory computer readable medium including instructions to perform operations for access control to a three-dimensional virtual environment is disclosed. The system, method, and operations can be implemented by, or by using, one or more computing devices (e.g., computers, servers, etc.). In aspects, the system, method, and operations can include receiving a request to generate a user session for a user to access the three-dimensional virtual environment. The request can indicate a level of access to be given to the user within the three-dimensional virtual environment. In aspects, privileges of the user within the three-dimensional virtual environment during the user session can be determined based on the request. In aspects, a duration for the user session can be determined based on the request. In aspects, a hyperlink can be generated to be transmitted to a user device to initiate the user session. In aspects, the hyperlink can be transmitted to an email account of the user. In aspects, a response can be received based on the user interacting with the hyperlink. In aspects, the user session can be initiated based on the received response. In aspects, the user session can be initiated by displaying a button or graphic on a dashboard of a graphical web interface that the user can click on to access the three-dimensional virtual environment.

In aspects, the system, method, and operations can further include initiating a timer to determine a length of time that has elapsed for the user session upon initiating the user session. In aspects, the user session can be terminated based on the length of time that has elapsed. For example, if the length of time that has elapsed for the session exceeds the duration set for the user session, the user session can be terminated.

In aspects, the system, method, and operations can further include adjusting the privileges of the user during the user session based on a user transaction purchasing additional privileges for the user session. In aspects, the privileges can include: reading data, writing data, displaying data, sharing data, viewing an area within the three-dimensional space, accessing an area within the three-dimensional space, or a combination thereof. In further aspects, the duration for the user session can be adjusted based on a user transaction purchasing additional time for the user session. In aspects, the privileges can also be adjusted by another user. For example, a host of a zone can adjust privileges of users in the zone. Take for example, a zone that represents a meeting room. The meeting room can have a moderator who can adjust privileges for users attending the meeting. In aspects, the moderator can allow access to the zone, grant access to screen share, or take away certain permission to moderate behavior, lessen noise, etc. during the meeting.

In aspects, the system, method, and operations can further include terminating the user session upon receipt of a further request to generate a further user session for a user to access the three-dimensional virtual environment.

In aspects, a system, computer-implemented method, and non-transitory computer readable medium including instructions to perform operations or controlling user connections to a three-dimensional virtual environment is disclosed. The system, method, and operations can be implemented by, or by using, one or more computing devices (e.g., computers, servers, etc.). In aspects, the system can include a load balancer configured to: receive a user request to access a zone of the three-dimensional virtual environment, and determine which web server to forward the user request to so that a user can access the zone based on the user request. In aspects, the web server can be coupled to the load balancer and can be configured to: receive the user request via the load balancer, query an orchestration server to identify which communication server is hosting the zone which the user request is requesting access to, and based on identifying the communication server, connect to the communication server. In aspects, the web server can further be configured to transmit to a client device from which the user request originated, video streams hosted on the communication server of the three-dimensional virtual environment for display on the client device. In aspects, the communication server can be coupled to the web server and can be configured to: host audio streams and video streams of the zone of the three-dimensional virtual environment, manage connections of the audio streams and the video streams between users within the zone, transmit the audio streams and the video streams to the web server, and connect the user to the zone based on the web server connecting to the communication server. In aspects, the orchestration server can be coupled to the web server and can be configured to: identify the communication server hosting the zone which the user request is requesting access to, and transmit the identity of the communication server to the web server.

In aspects, the communication server can be further configured to host multiple zones. In aspects, each zone of the multiple zones can be connected to a shard. In aspects, the zone can be separated into shards hosting audio streams and video streams of one or more users. In aspects, the communication server can be further configured to host up to 96 shards. In aspects, each shard of the plurality of shards is configured to host the audio streams and the video streams of 25 users. In aspects, the communication server is further configured to transmit to the web server the audio streams and the video streams of each of the users within the shard to only the users who are members of the shard. In aspects, the communication server is further configured to transmit to the web server the audio streams and the video streams of a VIP user to the users who are members of the shard, wherein the VIP user is not a member of the shard. In aspects, the communication server is further configured to: determine whether the users who are members of the shard have left the zone and have entered a further zone of the three-dimensional virtual environment, and connect the users who have left the zone to a further shard connected to the further zone.

Certain aspects of the disclosure have other steps or elements in addition to or in place of those mentioned above. The steps or elements will become apparent to those skilled in the art from a reading of the following detailed description when taken with reference to the accompanying drawings.

BRIEF DESCRIPTION OF THE DRAWINGS

The accompanying drawings, which are incorporated herein and form part of the specification, illustrate the present disclosure and, together with the description, further serve to explain the principles of the disclosure and to enable a person skilled in the relevant art to make and use the disclosure.

In the drawings, like reference numbers generally indicate identical or similar elements. Additionally, generally, the left-most digit(s) of a reference number identifies the drawing in which the reference number first appears.

DETAILED DESCRIPTION

Video Conference with Avatars in a Virtual Environment

Figure 1:
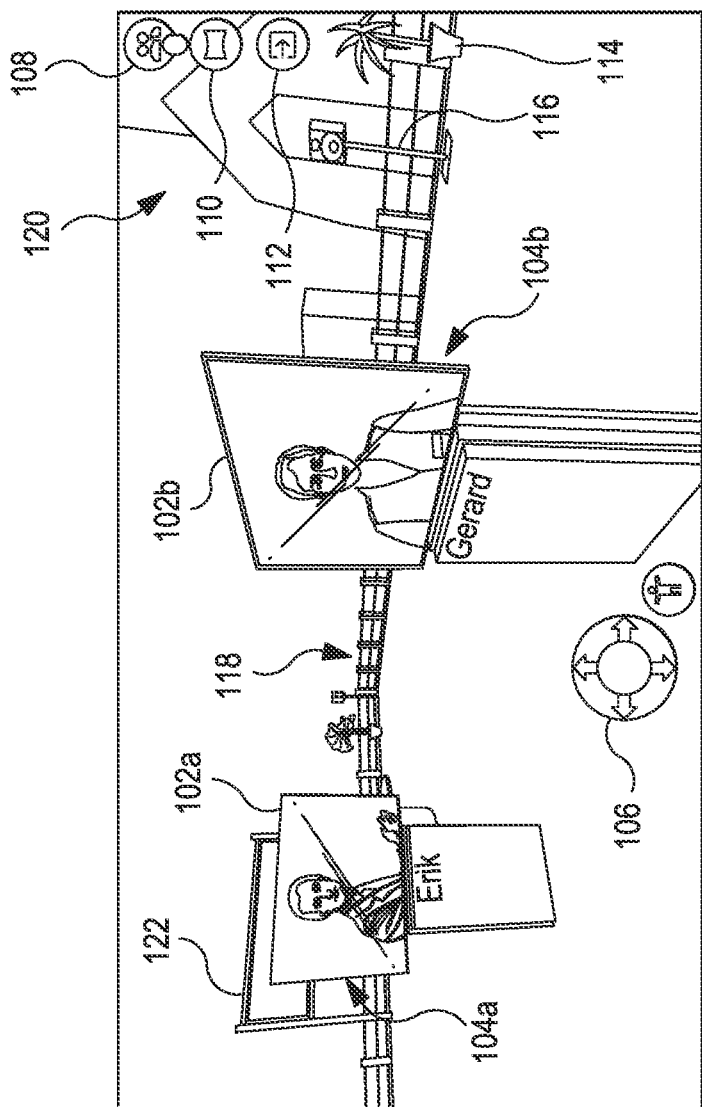
FIG. 1 is a diagram illustrating an example interface that provides videoconferencing in a three-dimensional virtual environment with video streams being mapped onto avatars, according to aspects.

FIG. 1 is a diagram illustrating an example interface 100 that provides videoconferencing in a three-dimensional virtual environment with video streams being mapped onto avatars, according to aspects. The interface 100 may be displayed to a participant in a videoconference. It should be noted that while videoconferencing is the primary example illustrated throughout this disclosure, the three-dimensional virtual environment and the interface 100 can be used for other purposes. For example, the three-dimensional virtual environment and the interface 100 can be used in MMO applications to display a game to a player, a virtual concert application to show an online concert to a concert goer, a virtual event application to show the event to an event goer, or generally as part of any software application designed to be used in the metaverse where a three-dimensional, immersive, interactive, and social experience is the goal of the application in which a user participates. A POSA will understand the applicability of the three-dimensional virtual environment and the interface 100 to various applications based on reading this disclosure.

Continuing with the videoconference example, in aspects, the interface 100 may be rendered for display to a participant of the videoconference, and may be constantly updated as the videoconference progresses. A user may control the orientation of their virtual camera using, for example, keyboard inputs, a gamepad controller, or touch screen inputs. In this way, the user can navigate around the three-dimensional virtual environment. In aspects, different inputs may change a virtual camera's X and Y position and pan and tilt angles in the three-dimensional virtual environment. In further aspects, a user may use inputs to alter height (the Z coordinate) or yaw of the virtual camera. In still further aspects, a user may enter inputs to cause the virtual camera to "hop" up while returning to its original position, simulating gravity. The inputs available to navigate the virtual camera may include, for example, keyboard, gamepad controller, and mouse inputs, such as WASD keyboard keys to move the virtual camera forward, backward, left, or right on an X-Y plane, a space bar key to "hop" the virtual camera, and mouse movements specifying changes in pan and tilt angles. Alternatively, users can use a virtual joystick 106 shown on a display and which can be interacted with by the user to perform the same functions.

In aspects, the interface 100 includes avatars 102a and 102b, which each represent different participants to the videoconference. Avatars 102a and 102b, respectively, have texture mapped video streams 104a and 104b from devices of the first and second participant. A texture map is an image applied (mapped) to the surface of a shape or polygon. Here, the images are respective frames of the video. The camera devices capturing video streams 104a and 104b are positioned to capture faces of the respective participants. In this way, the avatars have texture mapped thereon, moving images of faces as participants in the meeting talk and listen.

Similar to how the virtual camera is controlled by the user viewing the interface 100, the location and direction of avatars 102a and 102b are controlled by the respective participants that they represent. Avatars 102a and 102b are three-dimensional models represented by a mesh. Each avatar 102a and 102b may have the participant's name underneath the avatar.

The respective avatars 102a and 102b are controlled by the various users. They each may be positioned at a point corresponding to where their own virtual cameras are located within the three-dimensional virtual environment. Just as the user viewing the interface 100 can move around the virtual camera, the various users can move around their respective avatars 102a and 102b.

The three-dimensional virtual environment rendered in the interface 100 includes background image 120 and a three-dimensional model 118 of an arena. The arena may be a venue or building in which the videoconference should take place. The arena may include a floor area bounded by walls. The three-dimensional model 118 can include a mesh and texture. Other ways to mathematically represent the surface of three-dimensional model 118 may be possible as well. For example, polygon modeling, curve modeling, and digital sculpting may be possible. For example, the three-dimensional model 118 may be represented by voxels, splines, geometric primitives, polygons, or any other possible representation in three-dimensional space. The three-dimensional model 118 may also include specification of light sources. The light sources can include for example, point, directional, spotlight, and ambient. The objects may also have certain properties describing how they reflect light. In examples, the properties may include diffuse, ambient, and spectral lighting interactions.

In addition to the arena, the three-dimensional virtual environment can include various other three-dimensional models that illustrate different components of the environment. For example, the three-dimensional virtual environment can include a decorative model 114, a speaker model 116, and a presentation screen model 122. Just as model 118, these models can be represented using any mathematical way to represent a geometric surface in three-dimensional space. These models may be separate from model 118 or combined into a single representation of the three-dimensional virtual environment.

Decorative models, such as decorative model 114, serve to enhance the realism and increase the aesthetic appeal of the arena. The speaker model 116 may virtually emit sound, such as presentation and background music. The presentation screen model 122 can serve to provide an outlet to present a presentation. Video of the presenter or a presentation screen share may be texture mapped onto the presentation screen model 122.

A button 108 may provide the user a list of participants. In one example, after a user selects the button 108, the user can chat with other participants by sending text messages, individually or as a group.

A further button 110 may enable a user to change attributes of the virtual camera used to render the interface 100. For example, the virtual camera may have a field of view specifying the angle at which the data is rendered for display. Modeling data within the camera field of view is rendered, while modeling data outside the camera's field of view may not be. By default, the virtual camera's field of view may be set somewhere between 60 and 110 degrees, which is commensurate with a wide-angle lens and human vision. However, selecting the further button 110 may cause the virtual camera to increase the field of view to exceed 170 degrees, commensurate with a fisheye lens. This may enable a user to have broader peripheral awareness of his or her surroundings in the three-dimensional virtual environment.

Finally, a still further button 112 can cause the user to exit the three-dimensional virtual environment. Selecting the still further button 112 may cause a notification to be sent to devices belonging to the other participants signaling to their devices to stop displaying the avatar corresponding to the user that has exited the three-dimensional virtual environment.

In this way, the interface 100's virtual 3D space is used to conduct video conferencing. Every user controls an avatar, which they can control to move around, look around, jump or do other things which change the position or orientation. A virtual camera shows the user the three-dimensional virtual environment and the other avatars. The avatars of the other users have, as an integral part, a virtual display which shows the webcam image of the user.

By giving users a sense of space and allowing users to see each other's faces, aspects provide a more social experience than conventional web conferencing or conventional MMO gaming. That more social experience has a variety of applications. For example, it can be used in online shopping. For example, the interface 100 has applications in providing virtual grocery stores, houses of worship, trade shows, B2B sales, B2C sales, schooling, restaurants or lunchrooms, product releases, construction site visits (e.g., for architects, engineers, contractors), office spaces (e.g., people work "at their desks" virtually), controlling machinery remotely (ships, vehicles, planes, submarines, drones, drilling equipment, etc.), plant/factory control rooms, medical procedures, garden designs, virtual bus tours with guides, music events (e.g., concerts), lectures (e.g., TED talks), meetings of political parties, board meetings, underwater research, research on hard to reach places, training for emergencies (e.g., fire), cooking, shopping (with checkout and delivery), virtual arts and crafts (e.g., painting and pottery), marriages, funerals, baptisms, remote sports training, counseling, treating fears (e.g., confrontation therapy), fashion shows, amusement parks, home decoration, watching sports, watching esports, watching performances captured using a three-dimensional camera, playing board and role playing games, walking over/through medical imagery, viewing geological data, learning languages, meeting in a space for the visually impaired, meeting in a space for the hearing impaired, participation in events by people who normally can't walk or stand up, presenting the news or weather, talk shows, book signings, voting, MMOs, buying/selling virtual locations (such as those available in some MMOs like the SECOND LIFE game available from Linden Research, Inc. of San Francisco, CA), flea markets, garage sales, travel agencies, banks, archives, computer process management, fencing/sword fighting/martial arts, reenactments (e.g., reenacting a crime scene and or accident), rehearsing a real event (e.g., a wedding, presentation, show, space-walk), evaluating or viewing a real event captured with three-dimensional cameras, livestock shows, zoos, experiencing life as a tall/short/blind/deaf/white/black person (e.g., a modified video stream or still image for the virtual world to simulate the perspective that a user wishes to experience), job interviews, game shows, interactive fiction (e.g., murder mystery), virtual fishing, virtual sailing, psychological research, behavioral analysis, virtual sports (e.g., climbing/bouldering), controlling the lights etc. in your house or other location (domotics), memory palace, archaeology, gift shop, virtual visit so customers will be more comfortable on their real visit, virtual medical procedures to explain the procedures and have people feel more comfortable, and a virtual trading floor/financial marketplace/stock market (e.g., integrating real-time data and video streams into the virtual world, real-time transactions and analytics), virtual locations people have to go to as part of their work so they will actually meet each other organically (e.g., if you want to create an invoice, it is only possible from within the virtual location) and augmented reality where you project the face of the person on top of their AR headset (or helmet) so you can see their facial expressions (e.g., for military, law enforcement, firefighters, special ops), and making reservations (e.g., for a certain holiday home/car/etc.)

Figure 2:
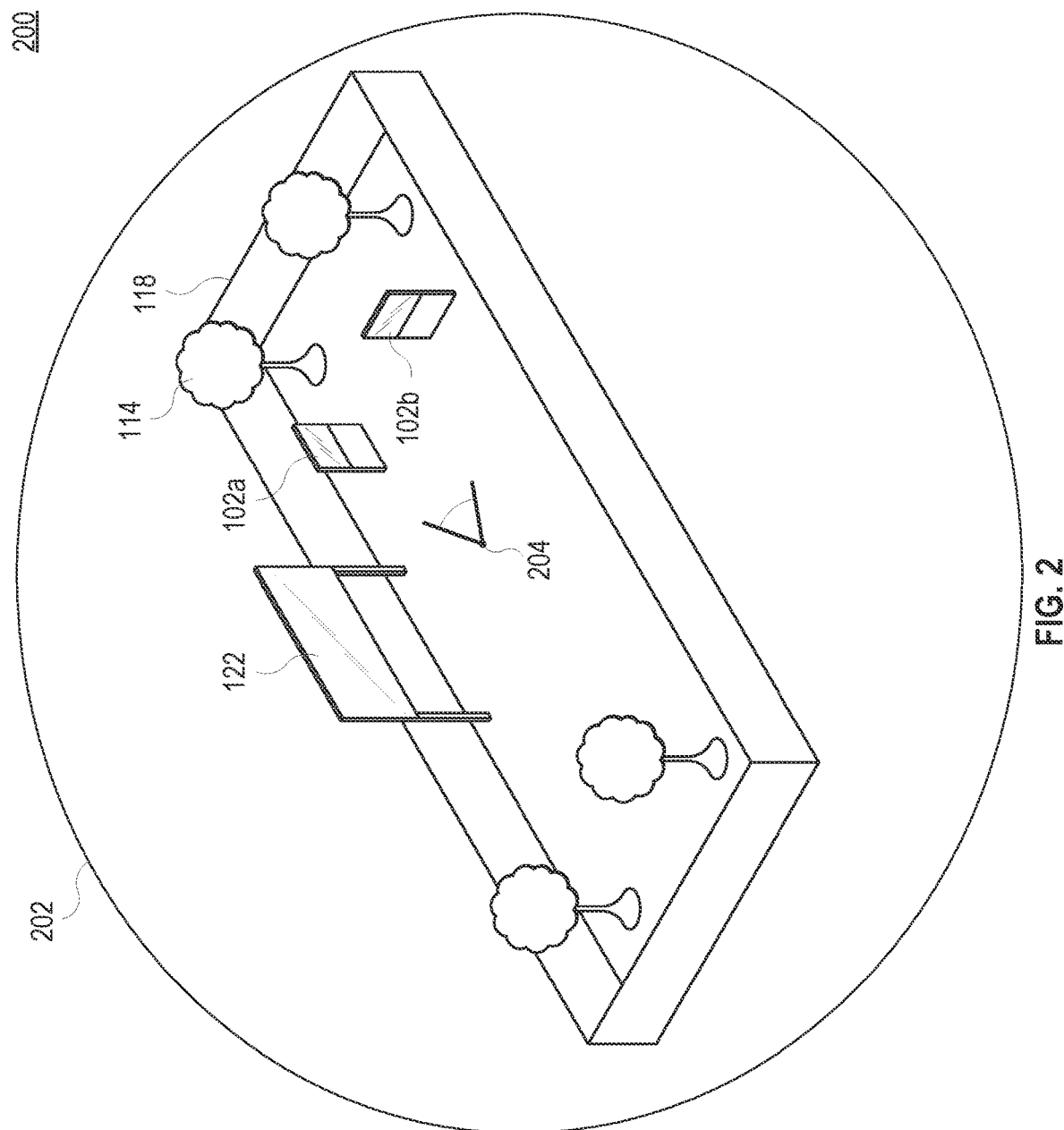
FIG. 2 is a diagram illustrating a three-dimensional model used to render the three-dimensional virtual environment with avatars for videoconferencing, according to aspects.

FIG. 2 is a diagram 200 illustrating a three-dimensional model used to render the three-dimensional virtual environment with avatars for videoconferencing, according to aspects. Just as illustrated in FIG. 1, the three-dimensional virtual environment here includes a three-dimensional arena 118, and various three-dimensional models, including three-dimensional models 114 and 122. Also as illustrated in FIG. 1, diagram 200 includes avatars 102a and 102b navigating around the three-dimensional virtual environment.

As described above, interface 100 in FIG. 1 is rendered from the perspective of a virtual camera. That virtual camera is illustrated in diagram 200 as a virtual camera 204. As mentioned above, the user viewing interface 100 in FIG. 1 can control the virtual camera 204 and navigate the virtual camera 204 in three-dimensional space. The interface 100 is constantly being updated according to the new position of the virtual camera 204 and any changes of the models within the field of view of the virtual camera 204. As described above, the field of view of the virtual camera 204 may be frustum defined, at least in part, by horizontal and vertical field of view angles.

As described above with respect to FIG. 1, a background image, or texture, may define at least part of the three-dimensional virtual environment. The background image may capture aspects of the three-dimensional virtual environment that are meant to appear at a distance. The background image may be texture mapped onto a sphere 202. The virtual camera 204 may be at an origin of the sphere 202. In this way, distant features of the three-dimensional virtual environment may be efficiently rendered.

In other aspects, other shapes instead of the sphere 202 may be used to texture map the background image. In various alternative aspects, the shape may be a cylinder, cube, rectangular prism, or any other three-dimensional geometry.

Figure 3:
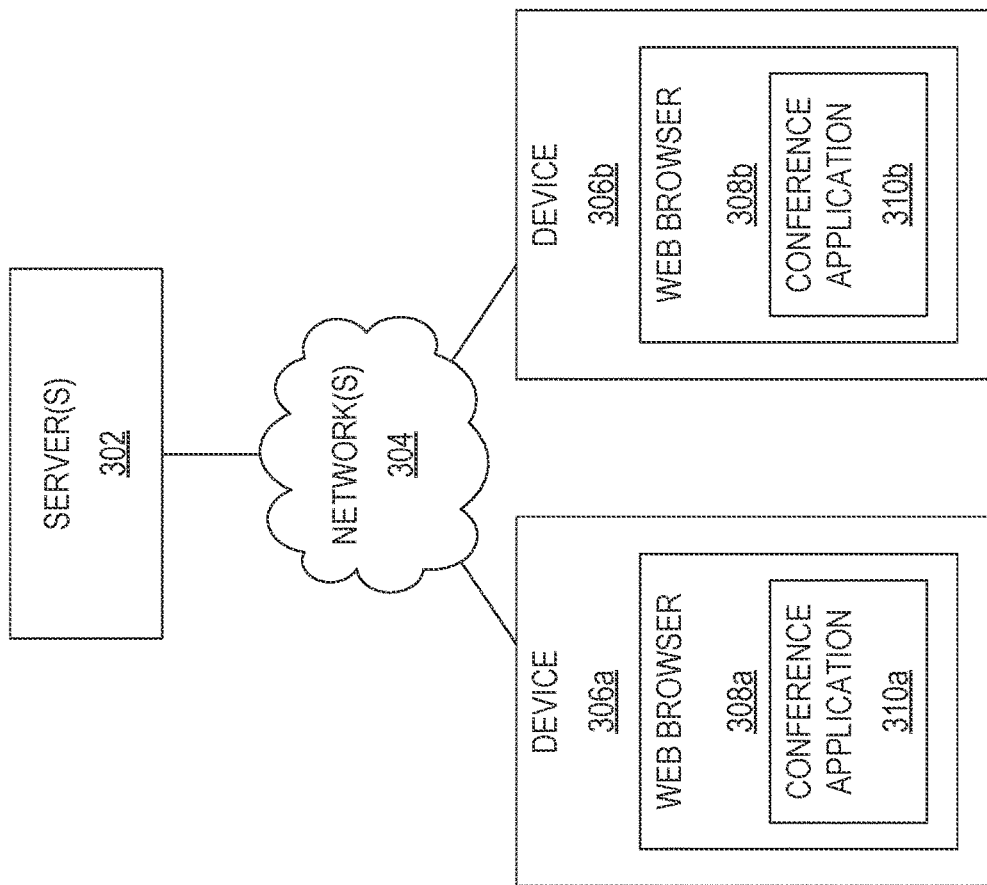
FIG. 3 is a diagram illustrating a system that provides videoconferences in the three-dimensional virtual environment, according to aspects.

FIG. 3 is a diagram illustrating a system 300 that provides videoconferences in the three-dimensional virtual environment. The system 300 includes one or more servers 302 coupled to devices 306a and 306b via a network 304.

The servers 302 provide the services to connect a videoconference session between devices 306a and 306b. As will be described in greater detail below, the servers 302 communicate notifications to devices of conference participants (e.g., devices 306a and 306b) when new participants join the conference and when existing participants leave the conference. The servers 302 communicate messages describing a position and direction in the three-dimensional virtual environment for respective participant's virtual cameras within the three-dimensional virtual environment. The servers 302 also communicate video and audio streams between the respective devices of the participants (e.g., devices 306a and 306b). Finally, the servers 302 store and transmit data describing data specifying the three-dimensional virtual environment to the respective devices 306a and 306b.

In addition to the data necessary for the virtual conference, the servers 302 may provide executable information that instruct the devices 306a and 306b on how to render the data to provide the interactive conference.

The servers 302 respond to requests with a response. The servers 302 may include a web server. A web server is software and hardware that uses HTTP (Hypertext Transfer Protocol) and other protocols to respond to client requests made over the World Wide Web. The main job of the web server is to display website content through storing, processing, and delivering web pages to users. The web server and its functionality will be discussed further below.

In an alternative aspect, communication between devices 306a and 306b happens not through the servers 302 but on a peer-to-peer basis. In that aspect, one or more of the data describing the respective participants' location and direction, the notifications regarding new and existing participants, and the video and audio streams of the respective participants are communicated not through server 302 but directly between devices 306a and 306b.

The network 304 enables communication between the various devices 306a and 306b and the servers 302. The network 304 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or any combination of two or more such networks.

The devices 306a and 306b are each devices of respective participants to the virtual conference. The devices 306a and 306b each receive data necessary to conduct the virtual conference and render the data necessary to provide the virtual conference. As will be described in greater detail below, the devices 306a and 306b include a display to present the rendered conference information, inputs that allow the user to control the virtual camera, a speaker (such as a headset) to provide audio to the user for the conference, a microphone to capture a user's voice input, and a camera positioned to capture video of the user's face.

The devices 306a and 306b can be any type of computing device, including a laptop, a desktop, a smartphone, a tablet computer, or a wearable computer (such as a smartwatch or a augmented reality or virtual reality headset).

Web browsers 308a and 308b can retrieve a network resource (such as a webpage) addressed by the link identifier (such as a uniform resource locator, or URL) and present the network resource for display. In particular, web browsers 308a and 308b are software applications for accessing information on the World Wide Web. Usually, web browsers 308a and 308b make this request using the hypertext transfer protocol (HTTP or HTTPS). When a user requests a web page from a particular website, the web browsers 308a and 308b retrieve the necessary content from a web server, interpret and execute the content, and then display the page on a display on devices 306a and 306b shown as client/counterpart conference applications 310a and 310b. In examples, the content may have HTML and client-side scripting, such as JavaScript. Once displayed, a user can input information and make selections on the page, which can cause web browsers 308a and 308b to make further requests.

Conference applications 310a and 310b may be web applications downloaded from the servers 302 and configured to be executed by the respective web browsers 308a and 308b. In an aspect, conference applications 310a and 310b may be JavaScript applications. In one example, conference applications 310a and 310b may be written in a higher-level language, such as a Typescript language, and translated or compiled into JavaScript. Conference applications 310a and 310b may be configured to interact with the WebGL JavaScript application programming interface. They may have control code specified in JavaScript and shader code written in OpenGL ES Shading Language (GLSL ES). Using the WebGL API, conference applications 310a and 310b may be able to utilize a graphics processing unit (not shown) of devices 306a and 306b. Moreover, OpenGL rendering of interactive two-dimensional and three-dimensional graphics without the use of plug-ins is also an option.

Conference applications 310a and 310b receive the data from the servers 302 describing position and direction of other avatars and three-dimensional modeling information describing the three-dimensional virtual environment. In addition, conference applications 310a and 310b receive video and audio streams of other conference participants from the servers 302.

Conference applications 310a and 310b render three three-dimensional modeling data, including data describing the three-dimensional virtual environment and data representing the respective participant avatars. This rendering may involve rasterization, texture mapping, ray tracing, shading, or other rendering techniques. In an aspect, the rendering may involve ray tracing based on the characteristics of the virtual camera. Ray tracing involves generating an image by tracing a path of light as pixels in an image plane and simulating the effects of encounters with virtual objects. In some aspects, to enhance realism, the ray tracing may simulate optical effects such as reflection, refraction, scattering, and dispersion.

In this way, the users use web browsers 308a and 308b to enter the three-dimensional virtual environment. The scene is displayed on the screen of the user. The webcam video stream and microphone audio stream of the user are sent to the servers 302. When other users enter the three-dimensional virtual environment, an avatar model is created for them. The position of this avatar is sent to the servers 302 and received by the other users. Other users also get a notification from the servers 302 that an audio/video stream is available. The video stream of a user is placed on the avatar that was created for that user. The audio stream is played back as coming from the position of the avatar.

Figure 4A:
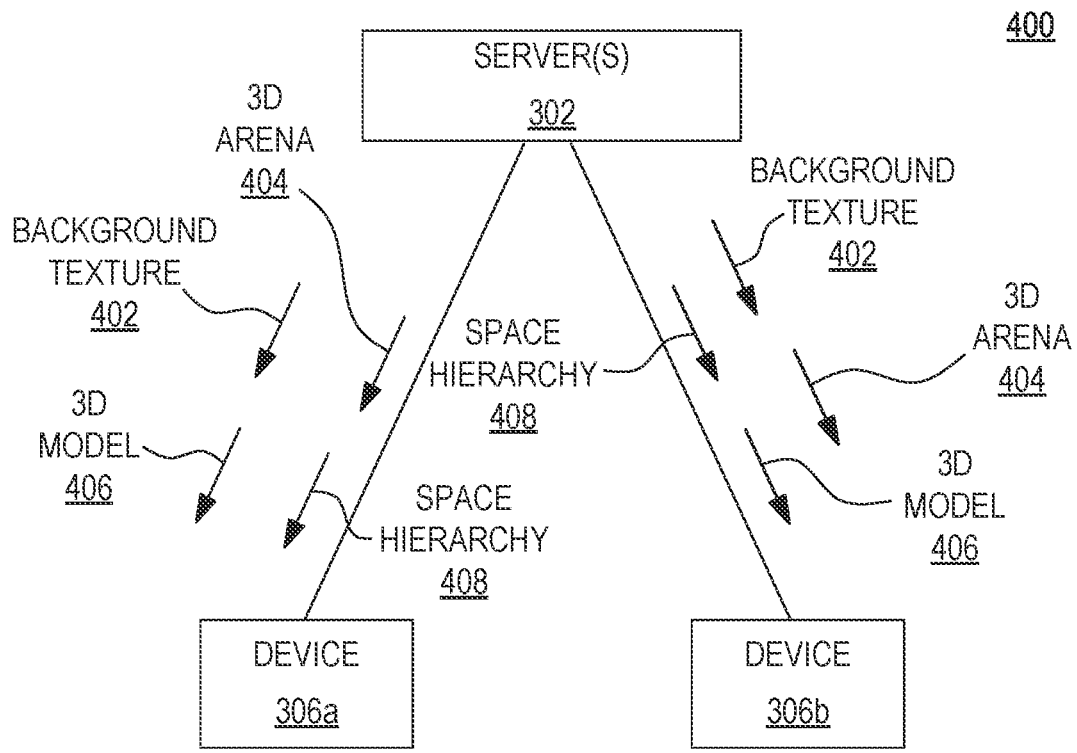
FIGS. 4A-C illustrate how data is transferred between various components of the system to provide videoconferencing, according to aspects.
Figure 4B:
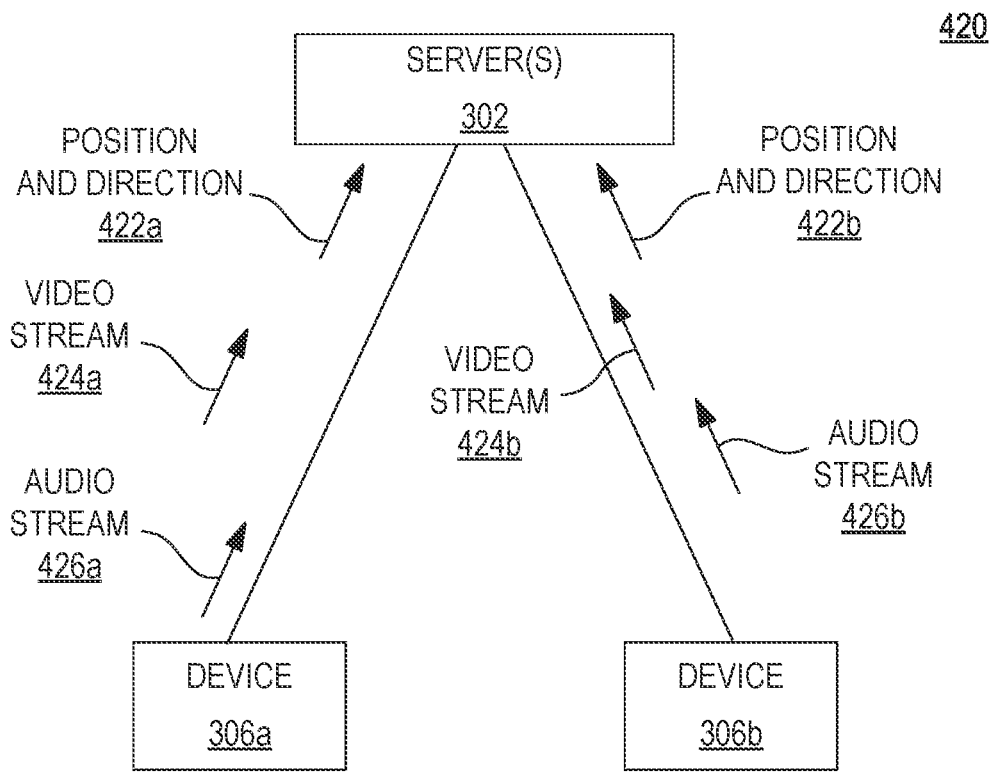
Figure 4C:
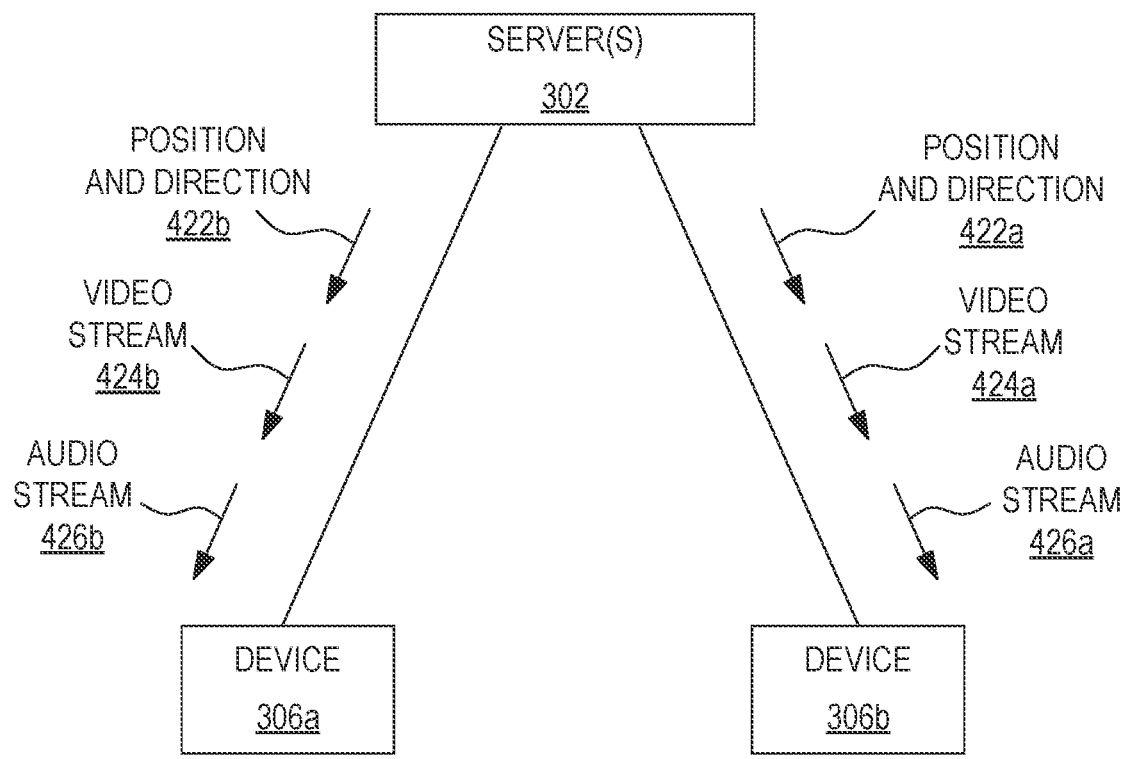

FIGS. 4A-C illustrate how data is transferred between various components of the system 300 to provide videoconferencing. Like in FIG. 3, each of FIGS. 4A-C depict the connection between the servers 302 and devices 306a and 306b. In particular, FIGS. 4A-C illustrate example data flows between those devices.

FIG. 4A illustrates a diagram 400 illustrating how the servers 302 transmit data describing the three-dimensional virtual environment to devices 306a and 306b. In particular, both devices 306a and 306b, receive from the servers 302 a three-dimensional arena 404 (similar to the three-dimensional arena 118 described with respect to FIG. 1), background texture 402, space hierarchy 408, and any other three-dimensional modeling information 406.

As described above, background texture 402 is an image illustrating distant features of the three-dimensional virtual environment. The image may be regular (such as a brick wall) or irregular. Background texture 402 may be encoded in any common image file format, such as bitmap, JPEG, GIF, or other file image format. It describes the background image to be rendered against, for example, a sphere at a distance.

The three-dimensional arena 404 is a three-dimensional model of the space in which the conference is to take place. As described above, it may include, for example, a mesh and possibly its own texture information to be mapped upon the three-dimensional primitives it describes. It may define the space in which the virtual camera and respective avatars can navigate within the three-dimensional virtual environment. Accordingly, it may be bounded by edges (such as walls or fences) that illustrate to users the perimeter of the navigable virtual environment.

The space hierarchy 408 is data specifying partitions in the three-dimensional virtual environment. These partitions are used to determine how sound is processed before being transferred between participants. The partition data may be hierarchical and may describe sound processing to allow for areas where participants to the virtual conference can have private conversations or side conversations.

The three-dimensional model 406 is any other three-dimensional modeling information needed to conduct the conference. In one aspect, this may include information describing the respective avatars. Alternatively or additionally, this information may include product demonstrations.

With the information needed to conduct the meeting sent to the participants, FIGS. 4B-C illustrate how the servers 302 forwards information from one device to another. FIG. 4B illustrates a diagram 420 showing how the servers 302 receive information from respective devices 306a and 306b, and FIG. 4C illustrates a diagram 420 showing how the servers 302 transmit the information to respective devices 306b and 306a. In particular, device 306a transmits position and direction 422a, video stream 424a, and audio stream 426a to the servers 302, which transmits position and direction 422a, video stream 424a, and audio stream 426a to device 306b. And device 306b transmits position and direction 422b, video stream 424b, and audio stream 426b to the servers 302, which transmit position and direction 422b, video stream 424b, and audio stream 426b to device 306a.

The position and direction 422a and 422b describe the position and direction of the virtual camera for the user using device 306a. As described above, the position may be a coordinate in three-dimensional space (e.g., x, y, and z coordinate) and the direction may be a direction in three-dimensional space (e.g., pan, tilt, and roll). In some aspects, the user may be unable to control the virtual camera's roll, so the direction may only specify pan and tilt angles. Similarly, in some aspects, the user may be unable to change the avatar's z coordinate (as the avatar is bounded by virtual gravity), so the z coordinate may be unnecessary. In this way, position and direction 422a and 422b each may include at least a coordinate on a horizontal plane in the three-dimensional virtual environment and a pan and tilt value. Alternatively or additionally, the user may be able to "jump" its avatar, so the Z position may be specified only by an indication of whether the user is jumping their avatar.

In different examples, position and direction 422a and 422b may be transmitted and received using HTTP request responses or using socket messaging.

Video streams 424a and 424b are video data captured from a camera of the respective devices 306a and 306b. The video may be compressed. For example, the video may use any commonly known video codecs, including MPEG-4, VP8, or H.264. The video may be captured and transmitted in real time.

Similarly, audio streams 426a and 426b are audio data captured from a microphone of the respective devices. The audio may be compressed. For example, the video may use any commonly known audio codecs, including MPEG-4 or vorbis. The audio may be captured and transmitted in real time. Video stream 424a and audio stream 426a are captured, transmitted, and presented synchronously with one another. Similarly, video stream 424b and audio stream 426b are captured, transmitted, and presented synchronously with one another.

The video streams 424a and 424b and audio streams 426a and 426b may be transmitted using the WebRTC application programming interface. The WebRTC is an API available in JavaScript. As described above, devices 306a and 306b download and run web applications, as conference applications 310a and 310b, and conference applications 310a and 310b may be implemented in JavaScript. Conference applications 310a and 310b may use WebRTC to receive and transmit video streams 424a and 424b and audio streams 426a and 426b by making API calls from its JavaScript.

As mentioned above, when a user leaves the virtual conference, this departure is communicated to all other users. For example, if device 306a exits the virtual conference, the servers 302 would communicate that departure to device 306b. Consequently, device 306b would stop rendering an avatar corresponding to device 306a, removing the avatar from the virtual space. Additionally, device 306b will stop receiving video stream 424a and audio stream 426a.

As described above, conference applications 310a and 310b may periodically or intermittently re-render the virtual space based on new information from respective video streams 424a and 424b, position and direction 422a and 422b, and new information relating to the three-dimensional virtual environment. For simplicity, each of these updates are now described from the perspective of device 306a. However, a skilled artisan would understand device 306b would behave similarly given similar changes.

As device 306a receives video stream 424b, device 306a texture maps frames from video stream 424a on to an avatar corresponding to device 306b. That texture mapped avatar is re-rendered within the three-dimensional virtual environment and presented to a user of device 306a.

As device 306a receives a new position and direction 422b, device 306a generates the avatar corresponding to device 306b positioned at the new position and oriented in the new direction. The generated avatar is re-rendered within the three-dimensional virtual environment and presented to the user of device 306a.

In some aspects, the servers 302 may send updated model information describing the three-dimensional virtual environment. For example, the servers 302 may send updated information 402, 404, 406, or 408. When that happens, device 306a will re-render the three-dimensional virtual environment based on the updated information. This may be useful when the environment changes over time. For example, an outdoor event may change from daylight to dusk as the event progresses.

Again, when device 306b exits the virtual conference, the servers 302 send a notification to device 306a indicating that device 306b is no longer participating in the conference. In that case, device 306a would re-render the three-dimensional virtual environment without the avatar for device 306b.

While FIG. 3 and FIGS. 4A-C are illustrated with two devices for simplicity, a skilled artisan would understand that the techniques described herein can be extended to any number of devices. In an aspect, the data transferred in FIG. 4A may come from one network address for the servers 302, while the data transferred in FIGS. 4B-C can be transferred to/from another network address for the servers 302.

In one aspect, participants can set their webcam, microphone, speakers and graphical settings before entering the virtual conference. In an alternative aspect, after starting the application, users may enter a virtual lobby where they are greeted by an avatar controlled by a real person. This person is able to view and modify the webcam, microphone, speakers and graphical settings of the user. The attendant can also instruct the user on how to use the three-dimensional virtual environment, for example by teaching them about looking, moving around and interacting. When they are ready, the user automatically leaves the virtual waiting room and joins the real virtual environment.

Architecture of the System

Figure 5:
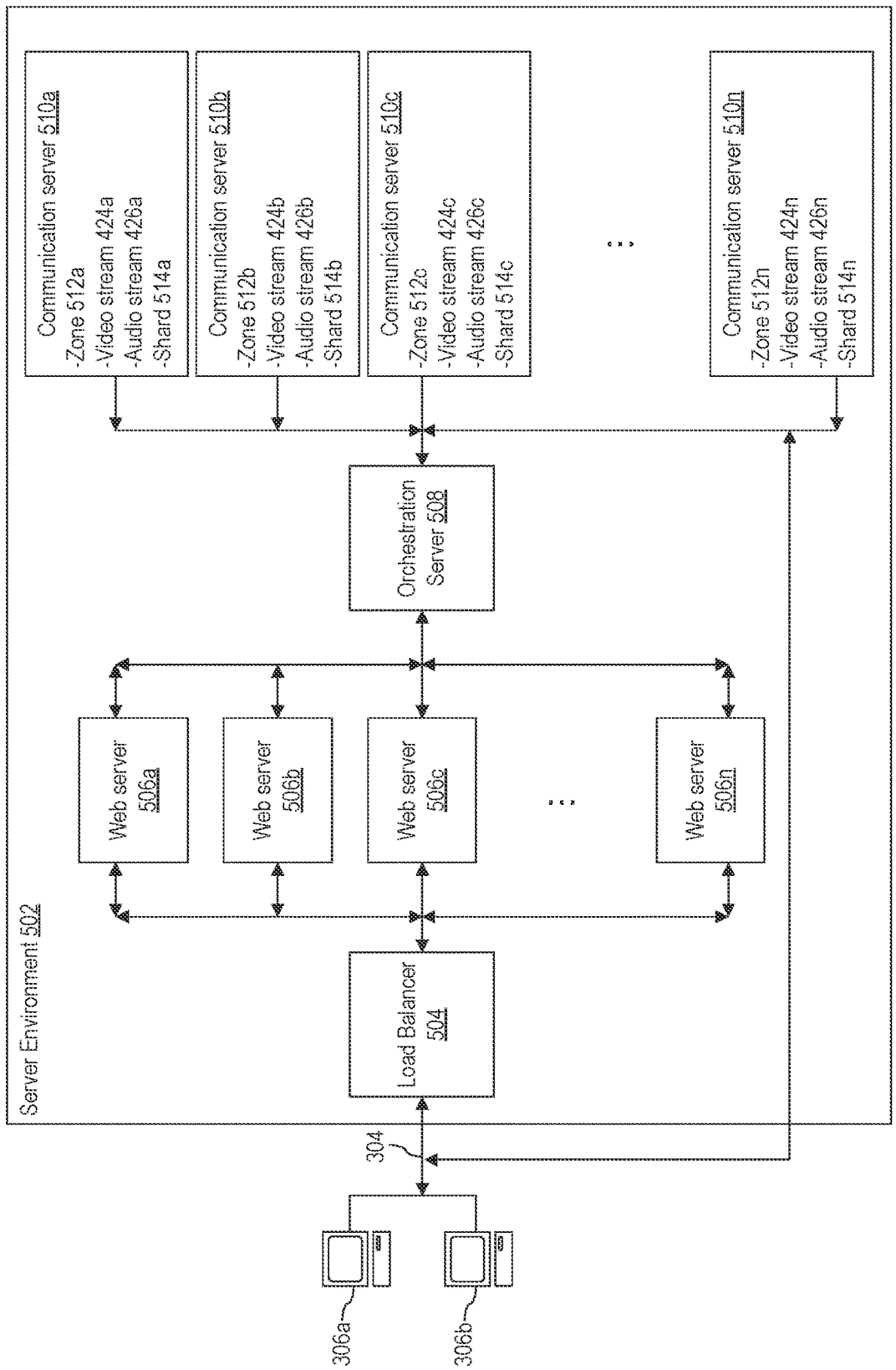
FIG. 5 is an example architecture of one or more servers of the system, according to aspects.

FIG. 5 is an example architecture 500 of the servers 302 of the system 300, according to aspects. The servers 302 can be a variety of centralized or decentralized computing devices. For example, the servers 302 may be implemented using a mobile device, a laptop computer, a desktop computer, grid-computing devices, virtualized computing devices, cloud computing devices, peer-to-peer distributed computing devices, a server farm, or a combination thereof. The servers 302 may be centralized in a single room, distributed across different rooms, distributed across different geographic locations, or embedded within the network 304. While the servers 302 can couple with the network 304 to communicate with devices 306a and 306b, the servers 302 can also function as stand-alone devices separate from devices 306a and 306b.

In aspects, the servers 302 can be grouped together in a server environment 502. In aspects, the server environment 502 can be a cloud computing environment. The cloud computing environment may be a public or private cloud service. Examples of a public cloud include Amazon Web Services (AWS), IBM Cloud, Oracle Cloud Solutions, Microsoft Azure Cloud, and Google Cloud. A private cloud refers to a cloud environment similar to a public cloud with the exception that it is operated solely for a single organization.

In aspects, the servers 302 can comprise a load balancer 504, one or more web servers 506, an orchestration server 508, and one or more communication servers 510. In FIG. 5, the web servers 506 are labeled {506a, 506b, 506c . . . , 506n} and the communication servers 510 are labeled {510a, 510b, 510c . . . , 510n}.

In aspects, the architecture 500 can be configured such that the load balancer 504 can be the entry point of data flowing from devices 306a and 306b and the server environment 502. In aspects, the load balancer 504 can be configured to receive a user request to access a zone 512 of the three-dimensional virtual environment. In FIG. 5, the zones are shown as {512a, 512b, 512c . . . , 512n}. In aspects, the zone 512 can be the same as the arena discussed in FIG. 1. In aspects, the user request can be sent via a graphical user interface (GUI) displayed on a web browser (e.g., web browsers 308a and 308b), in which a user of the system 300 can select/choose which zone 512 of the three-dimensional virtual environment they would like to access. For example, in a videoconferencing application, the zone 512 can be a specific conference room in the three-dimensional virtual environment that a user might want to access to have a virtual meeting. In aspects, the user might choose a graphic for the conference room or enter the conference room name/ID via the GUI to request access to the conference room. Thus, the GUI can serve as an entry point to a zone 512 of the three-dimensional virtual environment.

In aspects, the load balancer 504, upon receipt of the user request, can determine which web server of the web servers 506 to forward the user request to so that the user can access the zone 512 based on the user request. In this way, the load balancer 504 distributes user requests and application traffic across the web servers 506 efficiently so to not overwhelm the system 300, while allowing the user to connect to the desired zone 512.

As indicated with respect to FIG. 3, the web servers 506 can be servers (i.e., software and hardware) that use HTTP (Hypertext Transfer Protocol) and other protocols to respond to client requests made over the World Wide Web. The main job of the web servers 506 is to determine which of the communication servers 510 hosts the zone which the user is requesting, and to forward the connection information for the communication server to the devices 306a and 306b. In the context of the system 300 and architecture 500, the web pages are the interfaces and the associated models described with respect to FIGS. 1-4C that make up the three-dimensional virtual environment.

In aspects, the web servers 506 can be configured to receive the user requests via the load balancer 504. In aspects, once the user requests are received, the web servers 506 may be configured to query the orchestration server 508 to identify which communication server of the communication servers 510 is hosting the zone 512 that the user is requesting access to. The functions of the orchestration server 508 and the communication servers 510 will be discussed further below.

In aspects, based on identifying which of the communication servers 510 is hosting the zone 512, the web servers 506 can be configured to forward connection information of the appropriate communication server to the devices 306a and 306b. In aspects, if a communication server does not exist that is hosting the zone 512, the system 300 can be configured to have a communication server dynamically assigned to host the zone 512, and then have the communication server initiate the processes and instructions to render the interfaces and models required to host the zone 512. In aspects, and assuming a communication server can be identified that is hosting the zone 512, the web servers 506 can be configured to transmit to devices 306a or 306b from which the user request originated the connection information for the communication server so the devices 306a and/or 306b can connect to the communication server.

In aspects, the communication servers 510 can be configured to host audio and video streams (e.g., 424a, 424b, 426a, 426b, etc.) of zones (e.g., 512a, 512b, 512c . . . , 512n) of the three-dimensional virtual environment. In aspects, each of the communication servers 510 can host one or multiple zones. The hosting can include managing and processing the audio and video streams of users within each of the zones that the communication servers 510 are hosting so that these audio and video streams can be transmitted to the web servers 506 and can be forwarded to the users that are members of each of the zones.

In aspects, the communication servers 510 can further manage connections of the audio streams and video streams between users within each zone 512. For example, a communication server hosting a zone 512 can manage connections of the audio streams 426 and video streams 424 between users within a zone 512 so that it can enable or disable audio and video streams to each of the individual users within the zone 512. This may include, for example, enabling/disabling audio and video streams for a first user such that the other users within the zone 512 will or won't be able to see the first user's avatar or hear the first user speaking. In aspects, and as previously indicated, the communication servers 510 can further be configured to transmit the audio and video streams to devices 306a and 306b after they connect to the communication servers 510. In this way, the communication servers 510 can connect the users to the zone 512 that they are hosting.

In aspects, the communication servers 510 can be further configured to host multiple zones. Thus, each of the communication servers 510 can be configured to host multiple spaces/areas of the three-dimensional virtual environment. For example, each of the communication servers 510 can host different conference rooms of the three-dimensional virtual environment, or can host different levels of an MMO.

In aspects, the communication servers 510 can be configured such that each zone 512 is sharded (or connected to a shard 514). A shard 514 refers to a partitioning of the memory allocation on a communication server for a zone 512 such that only enough memory and bandwidth is allocated to host a maximum number of users based on the allocated memory and bandwidth. Thus, each of the shards can host a maximum number of users for a particular zone 512. The shards are represented in FIG. 5 as {514a, 514b, 514c ..., 514n}. In aspects, each of the shards can have a Mediasoup process running that manages the connections for communications for the users within the shard 514. Mediasoup refers to a WebRTC Selective Forwarding Unit (SFU) for Node.js that allows the applications to run multiparty video conferencing with browser and mobile devices in a multi-stream fashion. A POSA will know how to implement Mediasoup and therefore the details of the implementation will not be discussed in detail herein. It is assumed that the Mediasoup process can be run by the communication servers 510 for each shard 514. The Mediasoup process refers to the process by which the video conferencing is enabled by, for example, opening the ports necessary for communication, coordinating the receipt/sending of audio and video streams, forwarding packets and data to enable communication, etc.

In aspects, the communication servers 510 can be configured to monitor which users are entering and exiting a zone 512 and can manage the audio and video streams based on the same. For example, the communication servers 510 can determine whether the users who are members of the zone 512 have left the zone 512 and have entered a further zone 512 of the three-dimensional virtual environment. Based on determining the that a user has entered or exited the zone 512, the communication servers 510 can connect or disconnect those user's audio and video streams from the shard 514/zone 512 so that other members who are part of the shard 514/zone 512 will/won't be able to hear and see the user's avatar. In aspects, if the user has entered another zone 512, the communication servers 510 can be configured to manage the connections, via the Mediasoup process, and connect the users who have left a zone 512 to a further shard 514 connected to the further zone 512 that they have entered.

In aspects, each of the communication servers 510 can be configured to host a number of shards. For example, each of the communication servers 510 can be configured to host up to 96 shards. In aspects, each shard 514 can also host a number of users. For example, each shard 514 can be configured to host the audio and video streams of up to 25 users. In aspects, the communication servers 510 can be configured to transmit to the devices 306a and/or 306b the audio and video streams of each of the users within the shard 514 only to users who are members of the shard 514. It has been determined that limiting the number of users within a shard 514 to a maximum of 25 users provides the system 300 with optimal performance for processing audio and video streams and provides users the best user experience by minimizing latency and lag, and maximizing appearance and audio delivery for a videoconference.

In aspects, the orchestration server 508, as previously indicated, can receive a query from the web servers 506. In aspects, the orchestration server 508 can function to identify which of the communication servers 510 is hosting the zone 512 that the user is requesting access to. Thus, the orchestration server 508 forms an interface between the web servers 506 and the communication servers 510 to help connect the users to the correct communication server to connect a user to a zone 512. In aspects, the orchestration server 508 can be configured to transmit the identity of the communication server to the web server once it identifies the communication server that is hosting the requested zone 512. In aspects, the identity can be in the form of an IP address, a hyperlink to the communication server, a virtual address of the communication server, the name of the communication server, or other forms of identifying information known to a POSA, and that can be used by the web server to forward to devices 306a and/or 306b.

As indicated above, the architecture 500 is designed so that only members of the shard 514 can have their audio and video streams available to one another. However, in some applications it may be desired to have a user who is not a member of a shard 514 be visible or audible to members of a particular shard 514. For example, in a videoconference with a large number of users (e.g., 100 users), and where only one user is going to be presenting to the rest of the users, it is desirable to have the user presenting to be visible and audible to the rest of the users. However, because the users will be distributed amongst 4 shards (with 25 users in each), based on the architecture 500, these users typically would not be able to see or hear users outside of their particular shard 514. However, in an aspect, a solution to this problem is to designate the presenting user with Very Important Person (VIP) privileges such that the VIP user can be visible to all other users across shards. The VIP privileges can allow the VIP user to share video and audio streams, share content, etc. to all other users within the zone regardless of what shard 514 each of the users belongs to. Thus, each of the users across all 4 shards will be able to see and/or hear the VIP user in addition to only those users within their particular shard 514. This design can be used across many applications such as virtual concerts, virtual town hall meetings, virtual church sermons, etc. where one or a few users are the primary content providers but the number of users in the meeting exceeds the maximum number of users for a shard 514.

The architecture 500 described above provides an optimal experience for the delivery of audio and video streams for users of the three-dimensional virtual environment. For example, having the communication servers 510 host users within shards that host up to 25 users and have each of the communication servers 510 be able to host up to 96 shards has been discovered to deliver users with a high quality experience in a variety of videoconferencing applications and MMO applications based on current computing technologies. Thus, architecture 500 improves computing systems because it provides a novel architecture and distribution of computing resources to enable high quality videoconferencing within the three-dimensional virtual environment.

Additionally, the feature of having a VIP user have privileges to share audio, video, and content across users regardless of shards provides a solution for applications in which more than the maximum number allocated for a shard 514 are accessing the zone 512, and all need to hear or see a particular content provider. In this way, the efficiencies of architecture 500 can be preserved to the extent possible, while providing users access to the VIP members.

Figure 6:
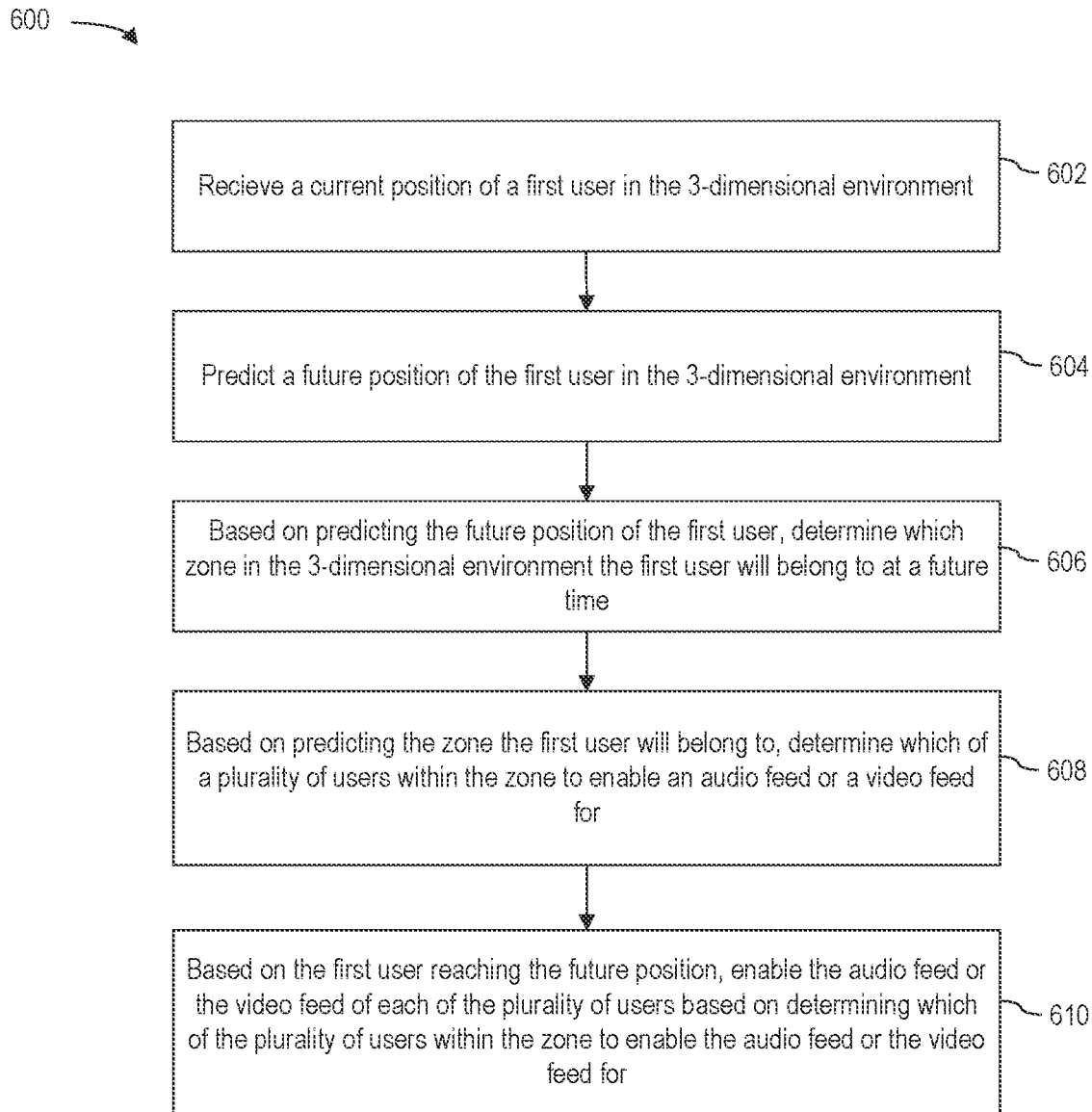
FIG. 6 is an example method of operating the system to control audio and video streams in the three-dimensional virtual environment, according to aspects.

Using Zones in a Three-Dimensional Virtual Environment for Limiting Audio and Video FIG. 6 is an example method 600 of operating the system 300 to control audio and video streams in the three-dimensional virtual environment, according to aspects. Method 600 can use the architecture 500 shown in FIG. 5 and the processes described with respect to FIGS. 1-4C.

The purpose of controlling audio and video streams is twofold. A first purpose is to optimize bandwidth for the system 300 by limiting audio and video streams to only those users needing to hear or see particular users. For example, video streams 424 in particular consume most of the bandwidth for the system 300 and are data intensive. They cause the system 300 to slow down if a large number of video streams 424 are streamed to all the users of the three-dimensional virtual environment at the same time. Thus, methods are needed to optimize what video streams 424 are necessary to be streamed and which are not.

The second purpose is to provide users of the system 300 privacy. In instances, certain groups of users may want to be walled off from other users so that their video and audio streams can only be heard by a subset of users within a particular zone 512 or amongst only a subset of users within the particular zone 512. Thus, methods are needed to limit audio and video to that subset of users.

Method 600 will be described with respect to a first user and/or a second user interacting within the three-dimensional virtual environment and/or with other users within a zone 512. Using the techniques described in method 600 the system 300 can control audio and video streams of the first user, second user, or other users in the three-dimensional virtual environment. While described with respect to a first user and/or a second user, the processes and techniques disclosed apply equally to any of the users within the three-dimensional virtual environment such that the audio and video streams for any of the users or in relation to the users can be controlled using the disclosed techniques.

In aspects, method 600 can begin by having one or more of the servers 302 (e.g., the communication servers 510) receive a current position of a first user in the three-dimensional virtual environment, as shown in 602. The current position can be the current position coordinates in three-dimensional space (e.g., x, y, and z coordinates) as described with respect to FIGS. 4A-C. In aspects, based on the current position, the system 300 can perform a series of computations to predict a future position of the first user in the three-dimensional virtual environment, as shown in 604. Based on the predicted future position of the first user, the system 300 can control which audio and video streams to enable or disable for the first user or for other users in relation to the first user.

For example, based on predicting the future position of the first user, a determination can be made as to which zone 512 in the three-dimensional virtual environment the first user will belong to at a future time, as shown in 606. Based on determining which zone 512 the first user will belong to at a future time (e.g., 'x' seconds in the future, where x is an integer), the system 300 can enable the audio and video streams for users within the zone for the first user, and enable the audio and video stream of the first user for the other users within the zone 512. In aspects, the system 300 can further disable any audio and video streams of other users not within the zone 512 for the first user, and disable the audio and video stream of the first user for any users not in the zone 512. The enabling/disabling of the audio and video streams can be performed as discussed previously with respect to FIGS. 3-5 using, for example, the Mediasoup process of the communications servers 510.

Predicting the future position of the first user can be based on several factors including: a distance of the first user to one or more zones, a direction of travel of the first user, a velocity of the first user, rotational movements of the first user, or a combination thereof. To perform the prediction, any number of algorithms can be used that are known in the art. These algorithms can include algorithms that can predict next position, trajectory, predicted paths, etc. Such algorithms can use for example Markov models, Hidden Markov models, Bayesian networks, Neural networks, LSTM models, etc. to perform the prediction. Specific algorithms can be used such as the Apriori-Traj Algorithm, the Traj-Prefix-Span Algorithm, the Hybrid Prediction Model algorithm, etc., and similar models and algorithms to make predictions about what the future position of the first user will be. In a simple example, embodiments may simply predict that a user may enter a zone based on a current position of the user being within a predetermined distance of the zone.

As indicated, in aspects, based on predicting the zone 512 the first user will belong to, a determination can be made as to which of a plurality of users within the zone 512 to enable an audio stream or a video stream for, where enabling the audio stream or the video stream will allow the first user to see or hear each of the plurality of users for which the audio stream or the video stream is enabled when the first user and each of the plurality of users are positioned within the zone, as shown in 608. Also, based on the prediction, the audio stream and video stream of the first user can be enabled for the plurality of users.

In aspects, further rules can be implemented to enable/disable the audio or video streams for only a subset of users within the zone 512 in relation to the first user. For example, rules based on distance between the first user and other users, whether the other users are facing the first user, etc. can be used to determine whether to enable/disable audio and video streams. For example, a rule can be implemented such that if other users avatars are not facing the first user's avatar, their audio and/or video streams will not be enabled for the first user to hear or see the other users despite both being within the zone 512. Additionally, rules can be implemented to enable/disable the audio and/or video streams based on certain degrees of rotation or angles. For example, rules can be set up such that only audio and video streams can be enabled for users within a certain angle of rotation of the first user. For example, audio and video streams can be enabled for users within an "x" degree or angle of rotation of the first user (e.g., 30 degrees, 45 degrees, 60 degrees, etc.), where "x" is a real number.

In aspects, rules can be implemented such that the audio and video streams can be enabled for the first user and/or the other users based on the first user reaching the future position, as shown in 610. In aspects, rules can be implemented such that the audio and video streams can be enabled for the first user and/or the other users based on the first user not being within the zone 512 but being less than a threshold distance to the zone 512. The threshold distance can be, for example, the first user being within a certain number of pixels of the zone 512 or being a Euclidean coordinate distance away from the zone 512. In aspects, if the first user is less than the threshold distance, the system can enable the audio stream or the video stream of each of the plurality of users for the first user, and vice versa enable the audio and/or video stream of the first user for the plurality of other users. In aspects, further rules can be implemented such that audio and/or video streams can be disabled for each of the plurality of users based on the first user being greater than or equal to the threshold distance to the zone 512, where the disabling causes the first user to not be able to see or hear each of the plurality of users. Similarly, the audio and/or video stream of the first user can be disabled for the other users.

In aspects, rules can be implemented such that audio and video streams can be enabled/disabled based on security settings of the first user, the plurality of users, or a combination thereof. By way of example, if the first user belongs to a particular group, department, etc., or has a particular security clearance or privileges (e.g., reading, writing, content presentation, audio streaming, video streaming, etc.) within the three-dimensional virtual environment but there are other users within the zone 512 that belong to other groups, departments, etc., or have lower security clearances or privileges, and it is desired that the first user only be able to see or hear other users within the zone with similar credentials or belonging to the same group, rules can be implemented to only allow video and/or audio streams where the first user and other users with similar security clearances or privileges, or belonging to the same group or department can see or hear one another. Aside from videoconferencing, these rules can also be applied in other contexts such as virtual concerts, virtual conferences, etc.

Additionally, certain social components can be added to the rules, such that if users have certain relationships to one another they may be able to hear or see one another. For example, and similar to functions of social media platforms, if the first user and other users are friends, belong to the same groups, etc. they may be able to see and hear one another. Additionally, rules can be set up and/or adjusted to change the degree to which friends of the first user can see or hear one another. For example, rules can be set up such that a friend of the first user can have their video and/or audio streams received by each other due to their relationship with the first user. The aforementioned are merely exemplary. A POSA will recognize the various rules that can be set up based on the security settings and/or relationships amongst users based on this disclosure. The rule can be specified and customized for each application for which the three-dimensional virtual environment is used.

In aspects, rules can also account for other users entering or being within proximity to the zone 512. For example, one or more of the servers 302 (e.g., the communication servers 510) can receive a current position of a second user in the three-dimensional virtual environment. Using the same techniques described above, a prediction can be made of a second future position of the second user in the three-dimensional virtual environment at a future time. In aspects, based on predicting the second future position of the second user, a determination can be made as to whether the second user will be less than the threshold distance to the zone 512 at the second future time. In aspects, based on determining that the second user will be less than the threshold distance to the zone 512, the audio stream or the video stream of the second user can be enabled to enable the first user to see or hear the second user when the first user and the second user are positioned within the zone 512 or less than the threshold distance to the zone 512. Similarly, the second user's audio and video streams can be enabled to allow other users to hear or see the second user.

The method 600 and techniques described above provide an optimal experience for the delivery of audio and/or video streams for users of the three-dimensional virtual environment. Method 600 also provides a way of using zones in a three-dimensional virtual environment for limiting audio and/or video streams. This use of zones can cause the system 300 to allocate resources more efficiently to provide a smoother audio and video experience for users of the three-dimensional virtual environment because it can reduce any unnecessary video and audio feeds from being sent by the servers 302. As indicated, this is particularly important for video streams 424 because these streams take up much of the bandwidth of the system 300, and therefore reducing the transmission of any unnecessary streams will allow less data to be transmitted by the system 300 decreasing latency and lag of the remaining streams being transmitted.

Access Control in Zones

Figure 7:
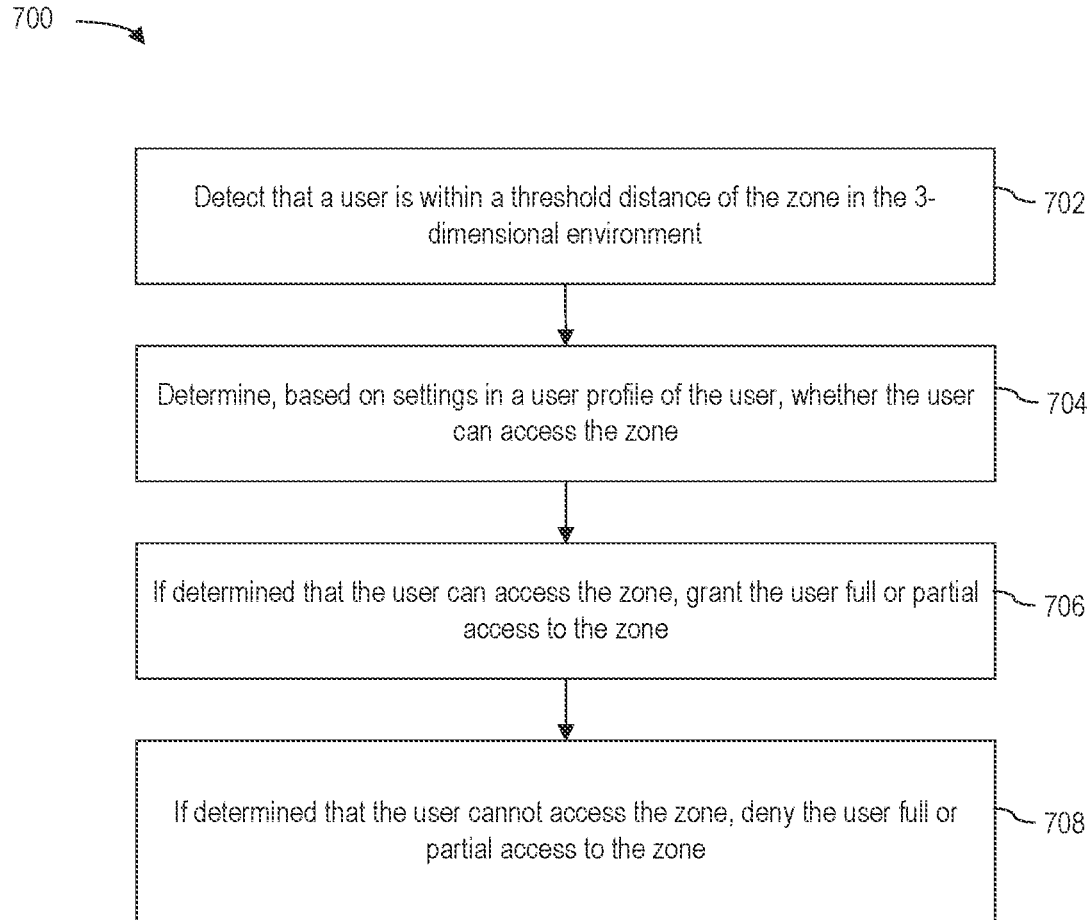
FIG. 7 is an example method of operating the system to provide access control to a zone in the three-dimensional virtual environment, according to aspects.

FIG. 7 is an example method 700 of operating the system 300 to provide access control to a zone 512 in the three-dimensional virtual environment, according to aspects. Method 700 can use the architecture 500 shown in FIG. 5 and the processes described with respect to FIGS. 1-4C. The purpose of controlling access to a zone 512 is to provide security and privacy for users of the three-dimensional virtual environment. For example, and taking the example of a videoconference, if the zone 512 is a conference room in which a private meeting is to be held where confidential information is to be revealed, users within the conference room will likely not want unauthorized users to enter the conference room. Similarly, if certain areas within an MMO are off limits to users that do not have a certain level of rights or credentials, the areas can be walled off to those users. In applications where the three-dimensional virtual environment represents an office building or setting, a zone can represent various rooms of the office building. In some of those rooms certain confidential information can be stored. Thus, it will be desirable that the rooms only be accessible to users with proper authorization or credentials to access those rooms. Thus, methods are needed to provide access control to zones.

In aspects, method 700 can begin by having one or more of the servers 302 (e.g., the communication servers 510) detect that a user is within a threshold distance (e.g., less than the threshold distance) of the zone 512 in the three-dimensional virtual environment, as shown in 702. The concept of the threshold distance is the same as what was described with respect to FIG. 6. In aspects, based on determining that the user is within the threshold distance, a determination can be made based on one or more settings whether the user can access the zone 512, as shown in 704.

In aspects, the settings can be settings in a user profile of the user. A user profile refers to a collection of settings and information associated with a user that can be used to grant certain rights and privileges to the user. A user profile can contain critical information that is used to identify a user, such as their name, age, portrait photograph and individual characteristics such as knowledge or expertise. Other information can include what access rights the user has within the three-dimensional virtual environment (e.g., reading, writing, presenting, content sharing, content receiving, etc.), what group(s) the user belongs to, and the security settings for the user (e.g., security clearances or special privileges such as VIP user status, etc.).

In aspects, the settings can be settings of the zone 512 itself. For example, zone 512 can also have a profile (i.e., a zone profile), that can allow only certain users access to the zone 512. Taking the example of a videoconference and a zone 512 representing a conference room or office, certain conference rooms or offices can be designated for certain users such as those with certain titles (e.g., Executives, Board members, Lawyers, Researchers, etc.). Thus, based on determining that a user is within the threshold distance of the conference room or office, the system 300 can determine, based on a user profile and based on the settings of the zone 512 whether a user has any of these titles and based on the title, rank, etc. of the user, whether the user has access to the particular conference room or office. Similarly, in an MMO application, players with certain ranks can be granted access to certain areas or levels of the game based on similar rules and comparisons. Similar principles apply to other applications such as concerts, events, etc.

In aspects, if determined that the user can access the zone 512, the user can be granted full or partial access to the zone 512, as shown in 706. If determined that the user cannot access the zone 512, the user can be denied full or partial access to the zone 512, as shown in 708.

Granting/denying full or partial access can again depend on the settings in a user profile and/or the settings of the zone 512. For example, a zone 512 while granting access to multiple users, may have settings giving/denying certain users access to certain areas within the zone 512 and granting/denying other users access to other areas within the zone 512. For example, if the zone 512 represents an office building, certain employees may have access to certain floors of the office building (e.g., researchers have access to the laboratories) while other employees may be restricted from the same floors. Another example is that executives may be granted access to certain floors reserved for executives while other employees may not be granted access to those floors.

In aspects, the full or partial access to the zone 512 can represent a variety of different access types. For example, the full or partial access can grant or limit visual access to areas of the zone 512. Full or partial access can also represent granting full or partial data communication privileges to users within the zone 512. The data communication privileges can include reading data, writing data, displaying data, sharing data, or a combination thereof, within the zone 512.

In the case of granting full or partial visual access to areas of the zone 512, and as was discussed, the full or partial access can grant or deny a user avatar visual access to areas of the zone 512. In aspects, by granting full or partial access to the zone 512, a user can be granted full or partial movement privileges within the zone 512. For example, if not granting users full movement privileges, limits can be placed on whether a user can "hop" up or the distance the user can "hop" up in the zone 512, as described with respect to FIG. 1, or limits can be placed on users viewing angles, how far a user can rotate, etc.

In aspects, visual indicators can also be used to limit visual access to areas of the zone 512. For example, virtual barriers, virtual walls, virtual police tape, etc. can be used to block access of users to areas of a zone 512. For example, in the example where the zone 512 is a conference room, a virtual door can be put at the entrance of the conference room that blocks users from entering the conference room and only users with a particular access code or credentials may be able to open the door, by for example, putting in a password, access code, etc. to open the door. In aspects, the password, access code, etc. can be sent to a user device as part of a two factor authentication and to access the zone 512 (e.g., the conference room), a user may be required to enter the password, access code, etc. to enter the zone 512. Alternatively, a hyperlink can be transmitted to a user device that when clicked grants the user access to the zone 512. In aspects, the system 300 can also recognize user credentials or access rights based on having the user be within a threshold distance of the door and based on the user profile the door can open for the user.

In aspects, if granting/denying full or partial data communication privileges, these privileges can be for example, speaking privileges, presenting privileges, privileges to edit (add, modify, delete) the zone 512, etc. For example, in a videoconferencing application, it may be that only one user should have the ability to present content. Thus, while multiple users may be credentialed to access the videoconference, only the designated user with the ability to present content will have the data communication privileges to do so. Similarly, it may be the case that certain users may not need their video streams or may not need to be granted audio privileges within the zone 512. In order to conserve bandwidth, the users may be granted access to the zone 512 but have their video and audio feeds disabled.

The method 700 and techniques described above provide a novel way of providing access rights to zones of a three-dimensional virtual environment. The techniques provide a way to limit certain spaces/zones 512 to particular users. This has a variety of benefits. For example, in a three-dimensional virtual environment, many functions may be performed. For example, and taking the example where the three-dimensional virtual environment is to simulate a virtual office, there may be hundreds of users using the virtual office, each having different security and access needs. Similar to how a physical office space works, certain users will need certain rights and will need to be denied certain rights. The methods described provide a mechanism to simulate and mimic these rights within a three-dimensional virtual environment, by providing ways to limit user avatars access to certain areas of the three-dimensional virtual environment. This provides the three-dimensional virtual environment with privacy and security capabilities. As a result, users can be assured that if they upload or store certain data or make certain disclosures within the three-dimensional virtual environment, that data will be secured and limited to those with sufficient privileges to see or access the data.

The methods also provide novel ways of securing data using visual indicators that gamify privacy and security capabilities. Typically, security and privacy functions are performed behind the scenes in software applications. The methods described above, by providing visual indicators, such as virtual doors, barriers, walls, etc. to block access to users in a zone 512 can allow for a visualization of privacy and security capabilities within the three-dimensional visual environment. The visualizations also allow the three-dimensional virtual environment to mimic real life scenarios where access to individuals is limited. This also adds to the realistic nature of the three-dimensional virtual environment. This is a benefit because one of the goals of the three-dimensional virtual environment is to provide as realistic virtual experience to users, which simulates real life scenarios but is virtual so that users do not have to be physically present in any geographic location.

Access Control to the Three-Dimensional Virtual Environment

Figure 8:
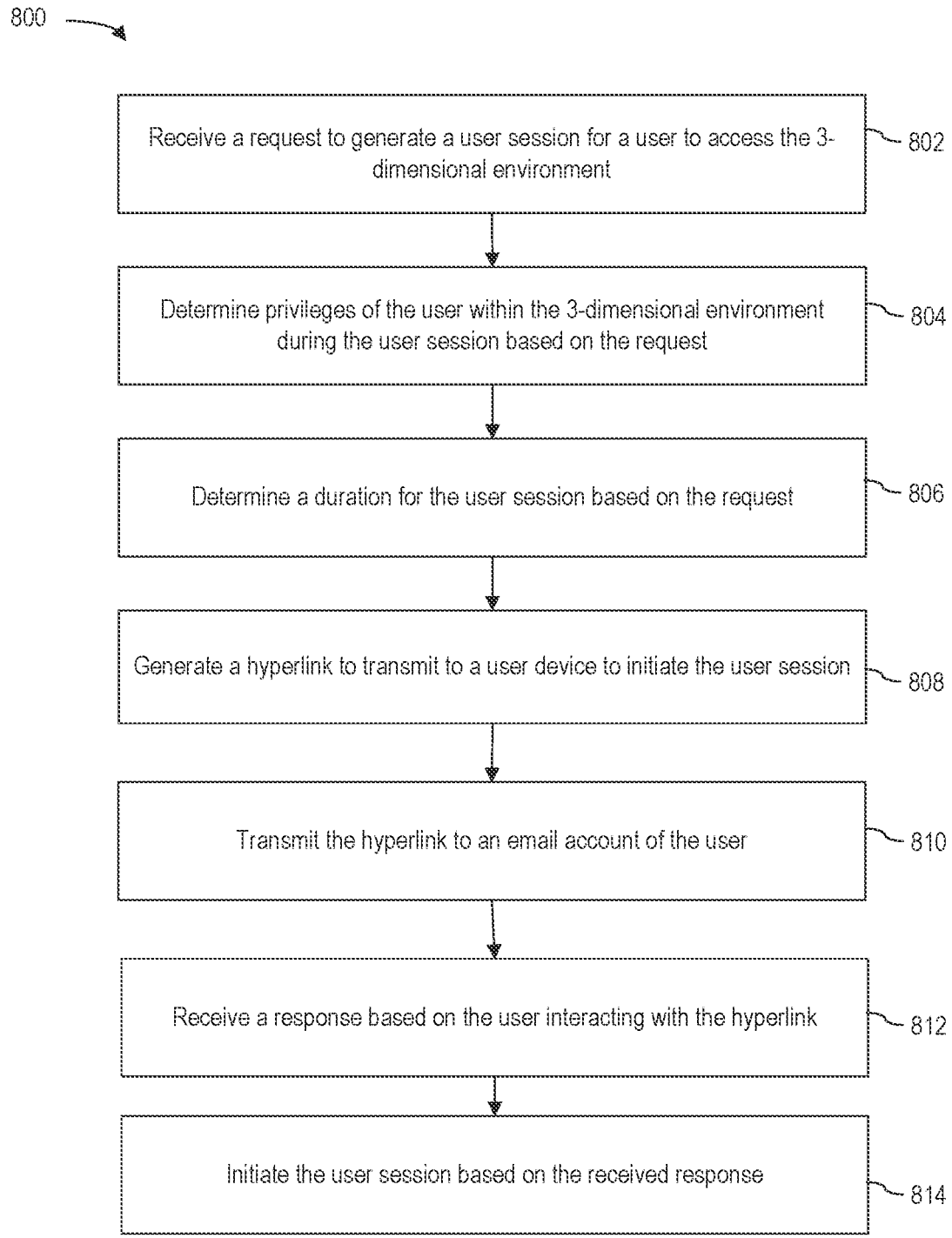
FIG. 8 is an example method of operating the system to provide access control to the three-dimensional virtual environment, according to aspects.

FIG. 8 is an example method 800 of operating the system 300 to provide access control to the three-dimensional virtual environment, according to aspects. Method 800 can use the architecture 500 shown in FIG. 5 and the processes described with respect to FIGS. 1-4C. Method 800 describes techniques similar to those used in method 700 for providing access control to a zone 512, however, method 800 deals with access control at one level higher and to the three-dimensional virtual environment itself. Thus, the purpose of method 800 is similar to method 700, except that it is focused on controlling access to the three-dimensional virtual environment itself rather than a particular zone 512. As a result, many of the concepts overlap between methods 700 and 800, and can be applied to each other.

In aspects, method 800 can begin by having one or more of the servers 302 (e.g., the communication servers 510) receive a request to generate a user session for a user to access the three-dimensional virtual environment, as shown in 802. In aspects, the request can originate from a registered user of the three-dimensional virtual environment, or by a registered user of the three-dimensional virtual environment on behalf of a guest third-party that wants to access the three-dimensional virtual environment.

In aspects, the request can indicate a level of access to be given to the user within the three-dimensional virtual environment. For example, if the request is made by a registered member of the three-dimensional virtual environment, the user can login using a username and password. The username can be sent to an authentication mechanism that can authenticate the username and password and associate it with a registered user. As indicated with respect to FIG. 6, the registered user may have a user profile. In aspects, the user profile may indicate a level of access that the user is granted within the three-dimensional virtual environment. The level of access can include privileges. In aspects, the privileges can include: reading data, writing data, displaying data, sharing data, viewing an area within the three-dimensional space, accessing an area within the three-dimensional space, or a combination thereof. These are similar and can be the same as those privileges discussed with respect to FIG. 7.

In aspects, a user session may be requested for a user that is not a registered member of the three-dimensional virtual environment. Take the example where the three-dimensional virtual environment represents an office. It may be the case that, similar to a physical office, a guest who is not an employee of the office may want to access the office. These guests can be, for example, clients, vendors, etc. that may have some business purpose for visiting the office but don't have access to the inside spaces of the office. Thus, these guests will need guest privileges or access to the office. In the physical world, such guests typically enter the office and are registered by an individual or system at a front desk, who/that takes down their personal information, and gives the guest access to the office. Similarly, a guest may want to access the three-dimensional virtual environment. In aspects, in order to grant access a registered user of the three-dimensional virtual environment will typically generate the request for the guest to access the environment. In other aspects, a guest can make a request for themselves via a web interface. In aspects, the request can indicate that guest privileges are needed for the guest. In aspects, the guest privileges can be less than or a subset of the privileges of registered users of the three-dimensional virtual environment. In this way, guests will have less access to the three-dimensional virtual environment so as to maintain security. While typically this is the case, it does not have to be and guests can be given the same privileges of a registered user of the three-dimensional virtual environment.

In aspects, as previously indicated, and once the request is received to generate a user session, the system 300 can determine what privileges should be granted to either the registered user or the guest during the user session based on the origin of the request (originating from a guest, a user on behalf of a guest, or a registered user), a user profile, etc., as shown in 804. In aspects, as a part of generating a user session, a duration for the user session can be established, as shown in 806. The duration refers to a length of time that the user session is active so that a user/guest, can access the three-dimensional virtual environment. In aspects, depending on the type of user, the duration can vary in length of time. For example, a registered user may be given indefinite time access to the three-dimensional virtual environment per user session. This is akin to having an employee be able to access an office whenever he or she chooses. In aspects, if the user is a guest, the duration can be limited to a fixed amount of time. For example, this can be a number of minutes, hours, days, etc. depending on the application for which the three-dimensional virtual environment is being used. For example, if the three-dimensional virtual environment is to be used as a courthouse, which the guests need access to in order to hold a virtual trial that is to last several days, the duration can be set for the several days that the trial is being held. In aspects, the duration can be padded with some buffer time so as to not abruptly end the user session once the duration is over. This feature improves user experience because users will not be abruptly kicked out of the three-dimensional virtual environment suddenly if for whatever reason they need to stay in the environment for a longer duration.

In aspects, to track the duration of time of the user session, the system 300 can initiate a timer to determine a length of time that has elapsed for the user session upon initiation of the user session. In aspects, the timer can track the duration of time that has lapsed to indicate to servers 302 of the system 300 (e.g., the communication servers 510), if the length of time that has elapsed for the user session exceeds the duration set for the user session. In such instances, the system 300, via servers 302, can terminate the user session upon receipt of the indication, or can terminate the user session after the buffer time has elapsed.

In aspects, and depending on the application for which the three-dimensional virtual environment is used, the system 300, prior to terminating the user session, can allow the user/guest to purchase additional time for the user session. Such a feature is useful for application such as virtual concerts, shows, or events. By way of example, if the three dimensional virtual environment is being used for a concert and the user session is set for the duration of the concert, it may be the case that there are additional concerts or exclusive content that is shown after the main event. In such cases, a user/guest may want to stay longer to preview or view those shows or content. In aspects, the system 300 can give the user/guest an option to purchase additional time. In aspects, such transactions can be facilitated through credits, fiat currency, cryptocurrency, rewards points, virtual tokens, etc.

In aspects, the concept of purchasing additional time can also be applied to allowing the user/guest to purchase additional privileges. For example, in applications, where users/guests have certain privileges, but want additional rights and privileges, they can similarly transact to purchase those privileges. By way of example, if the three-dimensional virtual environment is used for an MMO application, a user can transact to purchase access to certain game features, levels/zones 512, tools/weapons, items, etc. Similarly, if the three-dimensional virtual environment is used for an event where people can purchase time to speak (e.g., a standup comedy application, a TED talk, etc.), and users by default do not have access to speak, users can purchase time to speak, and thus be given speaking privileges. These are merely examples. A POSA will recognize what other privileges can be purchased based on a reading of this disclosure.

In aspects, in order to initiate a user session, the system 300 can generate a hyperlink to a user device (e.g., devices 306a or 306b) to initiate a user session, as shown in 808. In aspects, the hyperlink can be any HTTP link. The hyperlink can be sent to the user device in a variety of ways. In aspects, the hyperlink can be transmitted to an email account of the user, as shown in 810. Alternatively, the hyperlink can be transmitted via SMS or other messaging services to the user device. In aspects, the user session can be initiated based on the user/guest interacting with the hyperlink by, for example, clicking on the link to initiate the user session. In aspects, by clicking on the hyperlink, the user can initiate a response to the hyperlink, and as a result of the response have the servers 302 initiate the user session. Once the user session is initiated the user can be routed to a webpage as an entry point to the three-dimensional virtual environment, from which the user/guest can enter the environment and proceed with whatever the user/guest wants to do within the environment.

In aspects, the user session, rather than being initiated using a hyperlink sent to a user device, can be initiated by displaying a button or graphic on a dashboard of a graphical web interface that the user can click on to access the three-dimensional virtual environment. The button or graphic can be displayed on the dashboard (which can be a graphical user interface shown on a web browser, for example web browser 308a or 308b). The graphic or button can be clicked on which can forward the user to the three dimensional virtual environment.

In aspects, these same principles can be applied for users if they are within the three-dimensional virtual environment such that users already in the environment can be granted access to other three-dimensional virtual environments. Such a mechanism can be thought of as a portal between three-dimensional virtual environments. By way of example, if the three-dimensional virtual environment represents a level of an MMO, a user playing on the level can be sent a hyperlink, button, or graphic that can be displayed for a user on a graphical web interface that when clicked can allow the user to access another level of the MMO. In this way, user sessions can be initiated from within the three-dimensional virtual world itself.

In aspects, the system 300 can be set up so as to only allow one user session per user/guest. This is for safety and security purposes because at any given time it is desirable to have a single user have an active user session within the three-dimensional virtual environment. This is so that multiple computers cannot spoof the user's account/identity and overload the system 300 and/or pose as the user. Thus, in aspects, the system 300 can be configured so as to terminate a user session upon receipt of a further request to generate a further user session for a user. In this way, the single user single session policy can be maintained.

The method 800 and techniques described above provide a novel way of providing access rights to the three-dimensional virtual environment. The techniques provide a way to limit access to the three-dimensional virtual environment. Similar to the benefits described with respect to method 700, limiting access to the three-dimensional virtual environment will allow for security of the environment by not allowing or limiting rights and privileges of users to the extent that these rights are necessary. Additionally, method 800 provides a controlled mechanism to allow users (depending on the application), to purchase additional privileges and time within the three-dimensional virtual environment. In this way, the system 300 can control who has what privileges and how much time they spend on the system 300.

Additionally, method 800 provides a way of controlling who is in the three-dimensional virtual environment by setting durations and time limits for users on the system. This has two benefits. First, it provides the system 300 for security by limiting who can be on the system 300. Second, it improves the performance of the system 300 by limiting the number of users on the system 300 and releasing resources such as audio and video streams in a timely fashion by kicking users out of the system when they have achieved their purpose/objectives on the system 300. This improves the overall performance of the three-dimensional virtual environment by optimally allocating resources for the system 300.

Additional Methods of Operating the System

Figure 9:
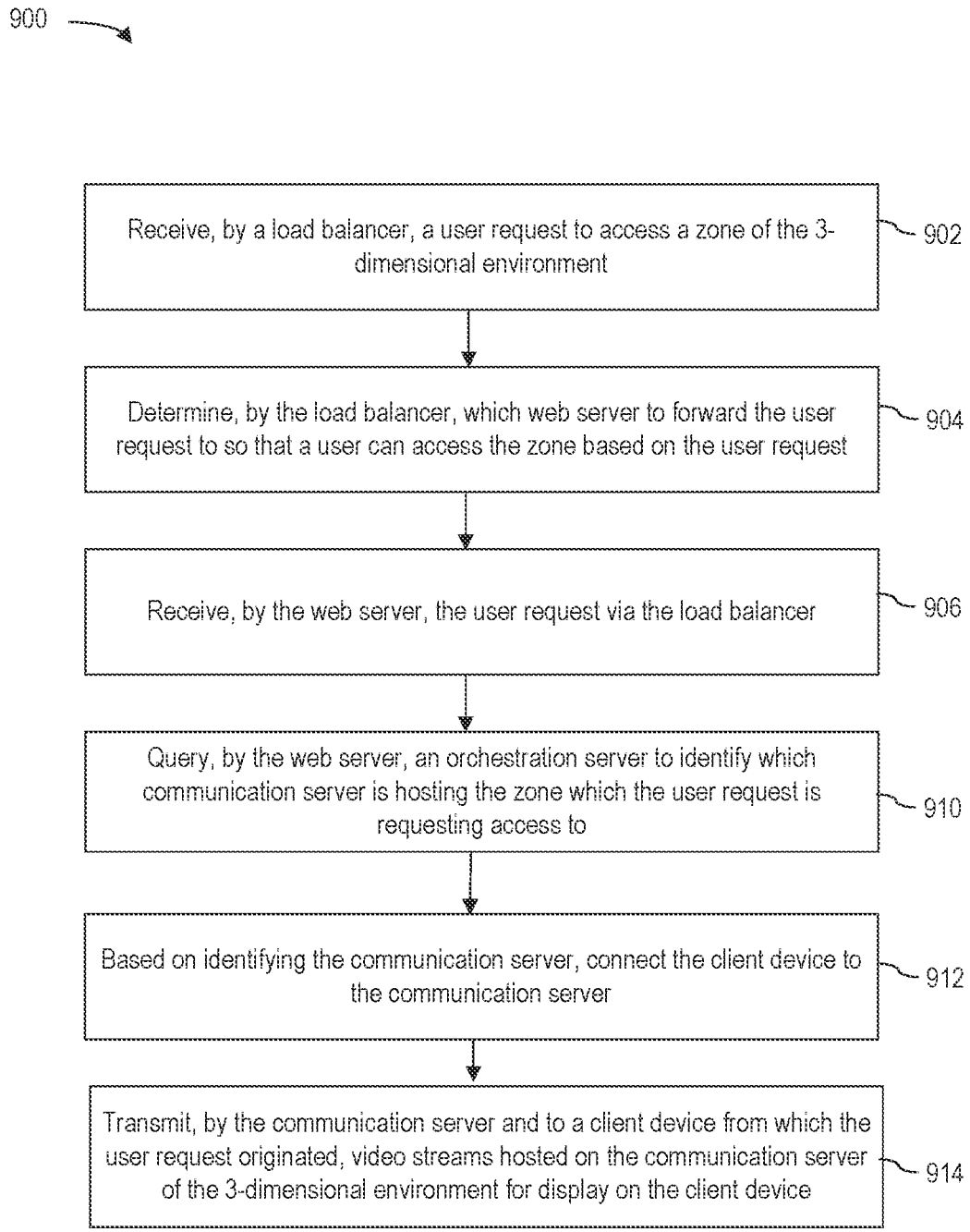
FIG. 9 is an example method of operating a load balancer and a web server of the system to control user connections to the three-dimensional virtual environment, according to aspects.
Figure 10:
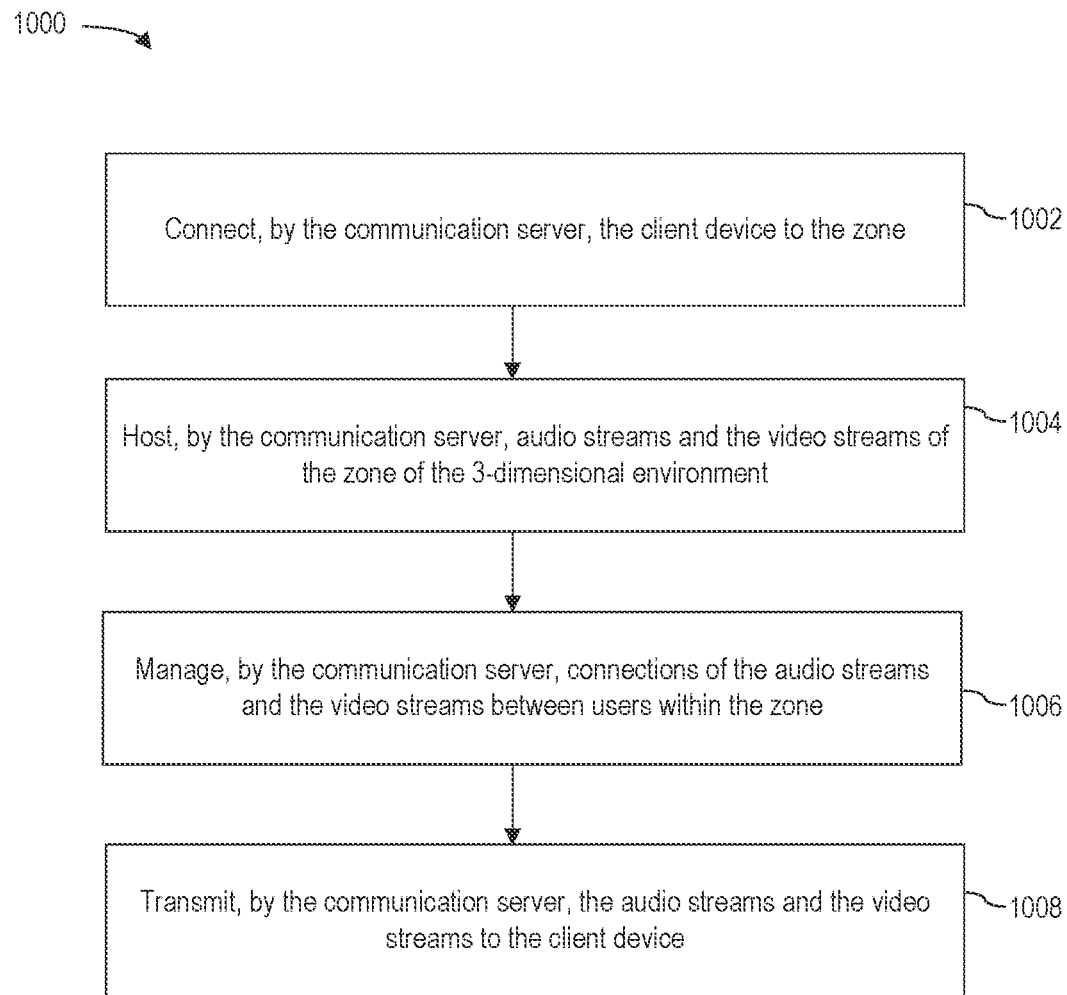
FIG. 10 is an example method of operating a communication server of the system to control user connections to the three-dimensional virtual environment, according to aspects.
Figure 11:
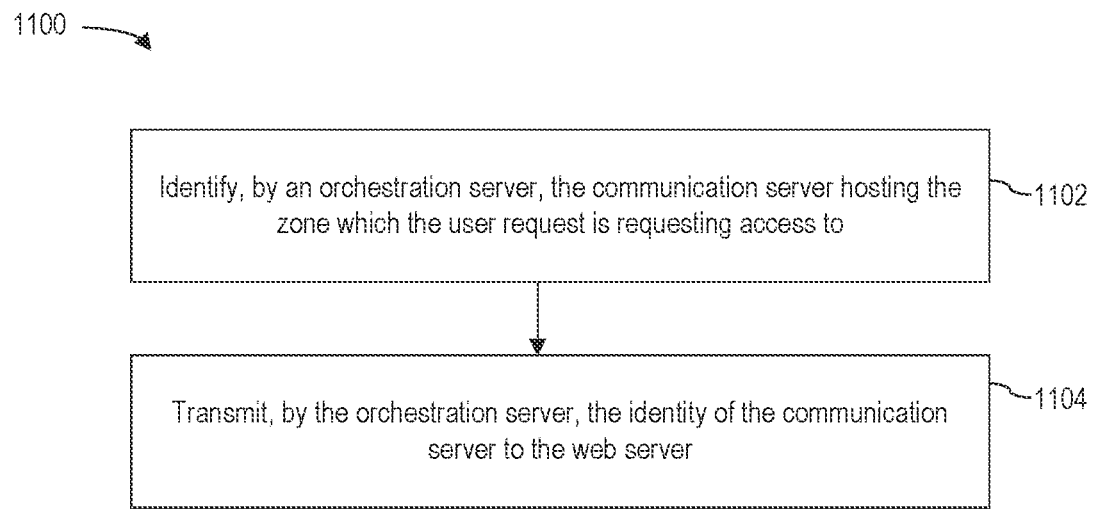
FIG. 11 is an example method of operating a orchestration server of the system to control user connections to the three-dimensional virtual environment, according to aspects.

FIGS. 9-11 discuss methods of operating the system 300 in accordance to the architecture 500. FIG. 9 is an example method 900 of operating the load balancer 504 and a web server (e.g., web server 506a, 506b, 506c . . . , or 506n) of the system 300 to control user connections to the three-dimensional virtual environment, according to aspects. In aspects, method 900 can have the load balancer 504 receive a user request to access a zone 512 of the three-dimensional virtual environment, as shown in 902. The load balancer 504 can determine which web server (506a, 506b, 506c . . . , or 506n) to forward the user request to so that a user can access the zone 512 based on the user request, as shown in 904. In aspects, the web server can receive the user request via the load balancer 504, as shown in 906. The web server can query an orchestration server 508 to identify which communication server (e.g., communication server 510a, 510b, 510c . . . , or 510n) is hosting the zone 512 which the user request is requesting access to, as shown in 910. Based on identifying the communication server, the client device can connect to the communication server, as shown in 912. In aspects, upon connecting to the communication server, the communication server can also be configured to transmit to a client device (e.g., 306a or 306b) from which the user request originated, video streams hosted on the communication server of the three-dimensional virtual environment for display on the client device, as shown in 914.

FIG. 10 is an example method 1000 of operating a communication server of the system 300 to control user connections to the three-dimensional virtual environment, according to aspects. In aspects, method 1000 can have the communication server connect the user to the zone 512 via a client device (e.g., 306a and/or 306b), as shown in 1002. In aspects, the communication server can host audio streams and video streams of the zone 512 of the three-dimensional virtual environment, as shown in 1004. In aspects, the communication server can manage connections of the audio streams and the video streams between users within the zone 512, as shown in 1006. In aspects, the communication server can transmit the audio streams and the video streams to the client device, as shown in 1008.

FIG. 11 is an example method 1100 of operating the orchestration server 508 of the system 300 to control user connections to the three-dimensional virtual environment, according to aspects. In aspects, method 1100 can have the orchestration server 508 identify the communication server hosting the zone 512 which the user request is requesting access to, as shown in 1102. The orchestration server 508 can further be configured to transmit the identity of the communication server to the web server, as shown in 1104.

The operation of methods 900, 1000, and 1100 are performed, for example, by system 300, in accordance with aspects described above.

Components of the System

Figure 12:
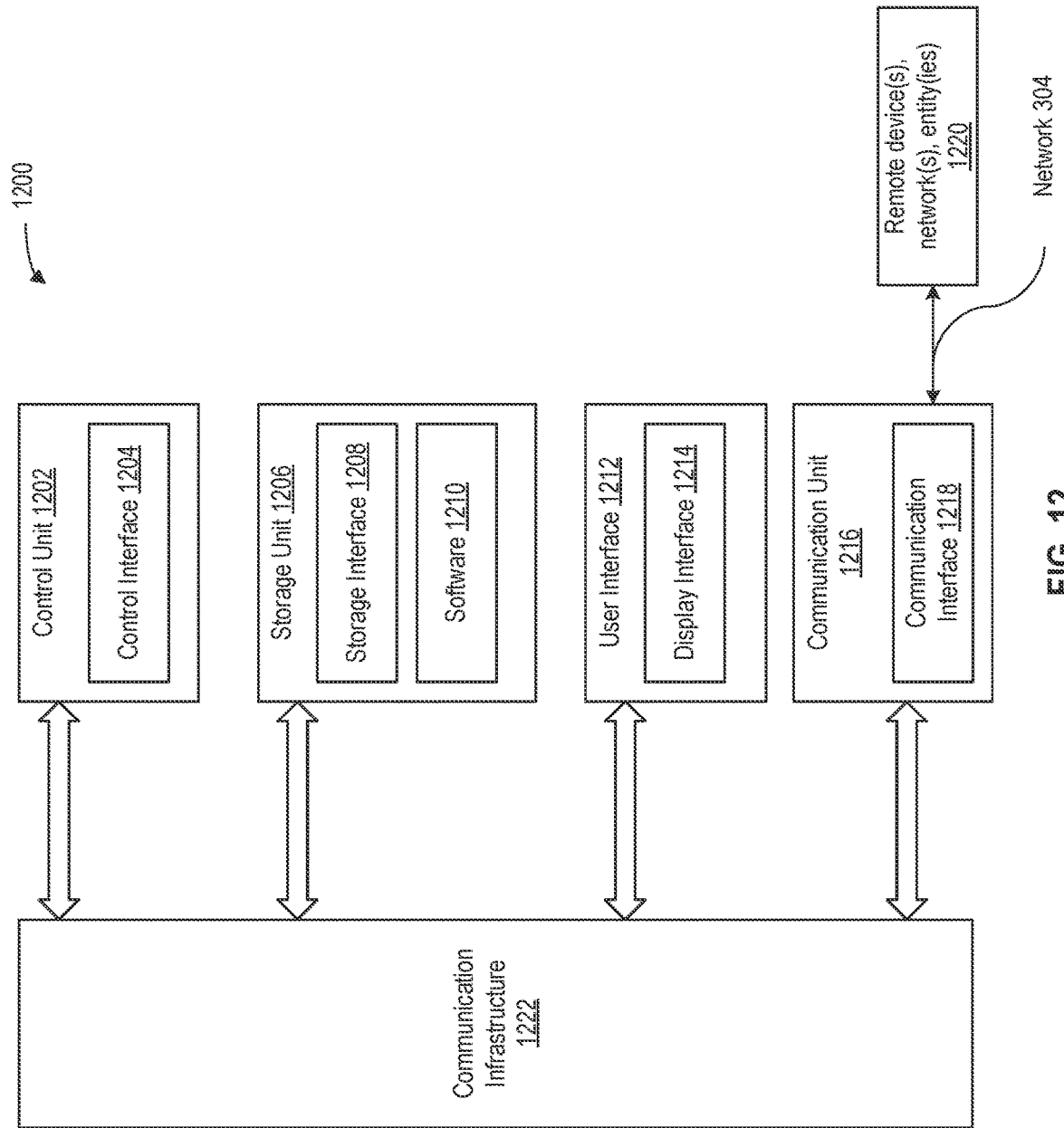
FIG. 12 is an example architecture of the components of the client devices and servers implementing the system, according to aspects.

FIG. 12 is an example architecture 1200 of the components client devices (306a or 306b) servers 302 implementing the system 300, according to aspects. In aspects, the components may include a control unit 1202, a storage unit 1206, a communication unit 1216, and a user interface 1212. The control unit 1202 may include a control interface 1204. The control unit 1202 may execute a software 1210 to provide some or all of the intelligence of system 300. The control unit 1202 may be implemented in a number of different ways. For example, the control unit 1202 may be a processor, an application specific integrated circuit (ASIC), an embedded processor, a microprocessor, a hardware control logic, a hardware finite state machine (FSM), a digital signal processor (DSP), a field programmable gate array (FPGA), or a combination thereof.

The control interface 1204 may be used for communication between the control unit 1202 and other functional units or devices of system 300. The control interface 1204 may also be used for communication that is external to the functional units or devices of system 300. The control interface 1204 may receive information from the functional units or devices of system 300, or from remote devices 1220, or may transmit information to the functional units or devices of system 300, or to remote devices 1220. The remote devices 1220 refer to units or devices external to system 300.

The control interface 1204 may be implemented in different ways and may include different implementations depending on which functional units or devices of system 300 or remote devices 1220 are being interfaced with the control unit 1202. For example, the control interface 1204 may be implemented with a pressure sensor, an inertial sensor, a microelectromechanical system (MEMS), optical circuitry, waveguides, wireless circuitry, wireline circuitry to attach to a bus, an application programming interface, or a combination thereof. The control interface 1204 may be connected to a communication infrastructure 1222, such as a bus, to interface with the functional units or devices of system 300 or remote devices 1220.

The storage unit 1206 may store the software 1210. For illustrative purposes, the storage unit 1206 is shown as a single element, although it is understood that the storage unit 1206 may be a distribution of storage elements. Also for illustrative purposes, the storage unit 1206 is shown as a single hierarchy storage system, although it is understood that the storage unit 1206 may be in a different configuration. For example, the storage unit 1206 may be formed with different storage technologies forming a memory hierarchical system including different levels of caching, main memory, rotating media, or off-line storage. The storage unit 1206 may be a volatile memory, a nonvolatile memory, an internal memory, an external memory, or a combination thereof. For example, the storage unit 1206 may be a nonvolatile storage such as nonvolatile random access memory (NVRAM), Flash memory, or disk storage, or a volatile storage such as static random access memory (SRAM) or dynamic random access memory (DRAM).

The storage unit 1206 may include a storage interface 1208. The storage interface 1208 may be used for communication between the storage unit 1206 and other functional units or devices of system 300. The storage interface 1208 may also be used for communication that is external to system 300. The storage interface 1208 may receive information from the other functional units or devices of system 300 or from remote devices 1220, or may transmit information to the other functional units or devices of system 300 or to remote devices 1220. The storage interface 1208 may include different implementations depending on which functional units or devices of system 300 or remote devices 1220 are being interfaced with the storage unit 1206. The storage interface 1208 may be implemented with technologies and techniques similar to the implementation of the control interface 1204.

The communication unit 1216 may enable communication to devices, components, modules, or units of system 300 or to remote devices 1220. For example, the communication unit 1216 may permit the system 300 to communicate between its components the client devices 306a/306b, and the servers 302. The communication unit 1216 may further permit the devices of system 300 to communicate with remote devices 1220 such as an attachment, a peripheral device, or a combination thereof through the network 304.

As previously indicated, the network 304 may span and represent a variety of networks and network topologies. For example, the network 304 may be a part of a network and include wireless communication, wired communication, optical communication, ultrasonic communication, or a combination thereof. For example, satellite communication, cellular communication, Bluetooth, Infrared Data Association standard (IrDA), wireless fidelity (WiFi), and worldwide interoperability for microwave access (WiMAX) are examples of wireless communication that may be included in the network 304. Cable, Ethernet, digital subscriber line (DSL), fiber optic lines, fiber to the home (FTTH), and plain old telephone service (POTS) are examples of wired communication that may be included in the network 304. Further, the network 304 may traverse a number of network topologies and distances. For example, the network 304 may include direct connection, personal area network (PAN), local area network (LAN), metropolitan area network (MAN), wide area network (WAN), or a combination thereof.

The communication unit 1216 may also function as a communication hub allowing system 300 to function as part of the network 304 and not be limited to be an end point or terminal unit to the network 304. The communication unit 1216 may include active and passive components, such as microelectronics or an antenna, for interaction with the network 304.

The communication unit 1216 may include a communication interface 1218. The communication interface 1218 may be used for communication between the communication unit 1216 and other functional units or devices of system 300 or to remote devices 1220. The communication interface 1218 may receive information from the other functional units or devices of system 300, or from remote devices 1220, or may transmit information to the other functional units or devices of the system 300 or to remote devices 1220. The communication interface 1218 may include different implementations depending on which functional units or devices are being interfaced with the communication unit 1216. The communication interface 1218 may be implemented with technologies and techniques similar to the implementation of the control interface 1204.

The user interface 1212 may present information generated by system 300. In aspects, the user interface 1212 allows a user to interface with the devices of system 300 or remote devices 1220. The user interface 1212 may include an input device and an output device. Examples of the input device of the user interface 1212 may include a keypad, buttons, switches, touchpads, soft-keys, a keyboard, a mouse, or any combination thereof to provide data and communication inputs. Examples of the output device may include a display interface 1214. The control unit 1202 may operate the user interface 1212 to present information generated by system 300. The control unit 1202 may also execute the software 1210 to present information generated by system 300, or to control other functional units of system 300. The display interface 1214 may be any graphical user interface such as a display, a projector, a video screen, or any combination thereof.

The terms "module" or "unit" referred to in this disclosure can include software, hardware, or a combination thereof in an aspect of the present disclosure in accordance with the context in which the term is used. For example, the software may be machine code, firmware, embedded code, or application software. Also for example, the hardware may be circuitry, a processor, a special purpose computer, an integrated circuit, integrated circuit cores, passive devices, or a combination thereof. Further, if a module or unit is written in the system or apparatus claims, the module or unit is deemed to include hardware circuitry for the purposes and the scope of the system or apparatus claims.

The modules and units in the aforementioned description of the aspects may be coupled to one another as described or as shown. The coupling may be direct or indirect, without or with intervening items between coupled modules or units. The coupling may be by physical contact or by communication between modules or units.

The above detailed description and aspects of the disclosed system 300 are not intended to be exhaustive or to limit the disclosed system 300 to the precise form disclosed above. While specific examples for system 300 are described above for illustrative purposes, various equivalent modifications are possible within the scope of the disclosed system 300, as those skilled in the relevant art will recognize. For example, while processes and methods are presented in a given order, alternative implementations may perform routines having steps, or employ systems having processes or methods, in a different order, and some processes or methods may be deleted, moved, added, subdivided, combined, or modified to provide alternative or sub-combinations. Each of these processes or methods may be implemented in a variety of different ways. Also, while processes or methods are at times shown as being performed in series, these processes or blocks may instead be performed or implemented in parallel, or may be performed at different times.

The resulting method 300 and system 300 is cost-effective, highly versatile, and accurate, and may be implemented by adapting components for ready, efficient, and economical manufacturing, application, and utilization. Another important aspect of aspects of the present disclosure is that it valuably supports and services the historical trend of reducing costs, simplifying systems, and/or increasing performance.

Identifiers, such as "(a)," "(b)," "(i)," "(ii)," etc., are sometimes used for different elements or steps. These identifiers are used for clarity and do not necessarily designate an order for the elements or steps.

These and other valuable aspects of the present disclosure consequently further the state of the technology to at least the next level. While the disclosed aspects have been described as the best mode of implementing system 300, it is to be understood that many alternatives, modifications, and variations will be apparent to those skilled in the art in light of the descriptions herein. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A computing system for controlling user connections to a three-dimensional virtual environment comprising:
   a load balancer configured to:
      receive a user request to access a zone representing a bounded area in the three-dimensional virtual environment, and
      determine a web server to forward the user request to so that a user can access the zone based on the user request;
   the web server having a memory and a processor coupled to the memory, the processor configured to:
      receive the user request via the load balancer,
      query an orchestration server to identify a communication server that is hosting the zone, and
      based on identifying the communication server, transmit identifying information of the communication server to a client device;
   the communication server, coupled to the web server, configured to:
      host audio streams and video streams of users within the zone across a plurality of shards, wherein each shard in the plurality of shards has memory and bandwidth allocated to host a maximum number of users and each shard hosts a subset of the audio streams and video streams,
      manage connections of the audio streams and the video streams between the users within the zone,
      transmit the subset of the audio streams and the video streams to the client device, the subset corresponding to a shard that the client device is a member of and transmit to the client device an audio stream and a video stream of a VIP user, wherein the VIP user is not a member of the shard, and
      connect the user to the zone based on the client device connecting to the communication server; and
   the orchestration server, coupled to the web server, configured to:
      identify the communication server hosting the zone, and
      transmit the identity of the communication server to the web server.

2. The system of claim 1, wherein the communication server is further configured to host a plurality of zones.

3. The system of claim 2, wherein each zone of the plurality of zones is sharded.

4. The system of claim 1, wherein the communication server is configured to host up to 96 shards.

5. The system of claim 1, wherein:
   each shard of the plurality of shards is configured to host the audio streams and the video streams of 25 users; and
   wherein the communication server is further configured to transmit the audio streams and the video streams of each of the users within the shard to only members of the shard.

6. The system of claim 1, wherein the communication server is further configured to:
   determine whether the user has left the zone and entered a further zone of the three-dimensional virtual environment; and
   connect the user to a further shard connected to the further zone.

7. A computer-implemented method for controlling user connections to a three-dimensional virtual environment, the method comprising:
   receiving, by a load balancer, a user request to access a zone representing a bounded area in the three-dimensional virtual environment;
   determining, by the load balancer, a web server to forward the user request to so that a user can access the zone based on the user request;
   receiving, by the web server, the user request via the load balancer;
   querying, by the web server, an orchestration server to identify a communication server that is hosting the zone;
   based on identifying the communication server, transmitting identifying information of the communication server to a client device;
   hosting, by the communication server, audio streams and video streams of users within the zone across a plurality of shards, wherein each shard in the plurality of shards has memory and bandwidth allocated to host a maximum number of users and each shard hosts a subset of the audio streams and video streams;

managing, by the communication server, connections of the audio streams and the video streams between the users within the zone;

transmitting, by the communication server, the subset of the audio streams and the video streams to the client device, the subset corresponding to a shard that the client device is a member of and transmit to the client device an audio stream and a video stream of a VIP user, wherein the VIP user is not a member of the shard;

connecting, by the communication server, the user to the zone based on the client device connecting to the communication server;

identifying, by the orchestration server, the communication server hosting the zone; and transmitting, by the orchestration server, the identity of the communication server to the web server.

8. The method of claim 7, further comprising hosting, by the communication server, a plurality of zones.

9. The method of claim 8, wherein each zone of the plurality of zones is sharded.

10. The method of claim 7, further comprising hosting, by the communication server, up to 96 shards.

11. The method of claim 7, wherein:
each shard of the plurality of shards is configured to host the audio streams and the video streams of 25 users; and
further comprising transmitting, by the communication server, the audio streams and the video streams of each of the users within the shard to only members of the shard.

12. The method of claim 7, further comprising:
determining, by the communication server, whether the user has left the zone and entered a further zone of the three-dimensional virtual environment; and
connecting, by the communication server, the user to a further shard connected to the further zone.

13. A non-transitory computer readable medium including instructions for controlling user connections to a three-dimensional virtual environment, that when executed by a computing system causes the computing system to perform operations comprising:
receiving, by a load balancer, a user request to access a zone representing a bounded area in the three-dimensional virtual environment;
determining, by the load balancer, a web server to forward the user request to so that a user can access the zone based on the user request;
receiving, by the web server, the user request via the load balancer;
querying, by the web server, an orchestration server to identify a communication server that is hosting the zone;
based on identifying the communication server, transmitting identifying information of the communication server to a client device;
hosting, by the communication server, audio streams and video streams of users within the zone across a plurality of shards, wherein each shard in the plurality of shards has memory and bandwidth allocated to host a maximum number of users and each shard hosts a subset of the audio streams and video streams;

managing, by the communication server, connections of the audio streams and the video streams between the users within the zone;

transmitting, by the communication server, the subset of the audio streams and the video streams to the client device, the subset corresponding to a shard that the client device is a member of and transmit to the client device an audio stream and a video stream of a VIP user, wherein the VIP user is not a member of the shard;

connecting, by the communication server, the user to the zone based on the client device connecting to the communication server;

identifying, by the orchestration server, the communication server hosting the zone; and transmitting, by the orchestration server, the identity of the communication server to the web server.

14. The non-transitory computer readable medium of claim 13, wherein the operations further comprise hosting, by the communication server, a plurality of zones.

15. The non-transitory computer readable medium of claim 14, wherein each zone of the plurality of zones is sharded.

16. The non-transitory computer readable medium of claim 12, wherein the operations further comprise hosting, by the communication server, up to 96 shards.

17. The non-transitory computer readable medium of claim 12, wherein:
each shard of the plurality of shards is configured to host the audio streams and the video streams of 25 users; and
the operations further comprise transmitting, by the communication server, the audio streams and the video streams of each of the users within the shard to only members of the shard.

18. The non-transitory computer readable medium of claim 12, wherein the operations further comprise:
determining, by the communication server, whether the user has left the zone and entered a further zone of the three-dimensional virtual environment; and
connecting, by the communication server, the user to a further shard connected to the further zone.

19. The system of claim 1, wherein a presenter is designated as the VIP user, and wherein the presenter has VIP privileges that allow the presenter to share a presenter video stream and a presenter audio stream with all the users in the zone regardless of the shard that the users are connected to.

20. The system of claim 1, wherein each shard in the plurality of shards comprises a process that manages connections between the users within the shard and opens ports necessary for communication.

21. The method of claim 7, wherein a presenter is designated as the VIP user, and wherein the presenter has VIP privileges that allow the presenter to share a presenter video stream and a presenter audio stream with all the users in the zone regardless of the shard that the users are connected to.

22. The method of claim 7, wherein each shard in the plurality of shards comprises a process that manages connections between the users within the shard and opens ports necessary for communication.

23. The non-transitory computer readable medium of claim 13, wherein a presenter is designated as the VIP user, and wherein the presenter has VIP privileges that allow the presenter to share a presenter video stream and a presenter audio stream with all the users in the zone regardless of the shard that the users are connected to.

24. The non-transitory computer readable medium of claim 13, wherein each shard in the plurality of shards comprises a process that manages connections between the users within the shard and opens ports necessary for communication.

\* \* \* \* \*

UNITED STATES PATENT AND TRADEMARK OFFICE
CERTIFICATE OF CORRECTION

| | | |
|---|---|---|
| PATENT NO. | : 11,876,630 B1 | Page 1 of 1 |
| APPLICATION NO. | : 17/813663 | |
| DATED | : January 16, 2024 | |
| INVENTOR(S) | : Krol et al. | |

It is certified that error appears in the above-identified patent and that said Letters Patent is hereby corrected as shown below:

In the Drawings

On sheet 7 of 13, FIG. 6, and on the title page, the illustrative print figure, Tag 602, Line 1, delete "Recieve" and insert -- Receive --, therefor.

In the Specification

In Column 6, Line 49, delete "a" and insert -- an --, therefor.

In Column 17, Line 29, after "determining", delete "the".

In the Claims

In Column 34, Claim 16, Line 24, delete "12," and insert -- 13, --, therefor.

In Column 34, Claim 17, Line 27, delete "12," and insert -- 13, --, therefor.

In Column 34, Claim 18, Line 36, delete "12," and insert -- 13, --, therefor.

Signed and Sealed this
Twenty-sixth Day of March, 2024

Katherine Kelly Vidal
*Director of the United States Patent and Trademark Office*